(12) United States Patent
Fujimoto et al.

(10) Patent No.: US 7,963,184 B2
(45) Date of Patent: Jun. 21, 2011

(54) VEHICLE TRANSMISSION

(75) Inventors: Yasushi Fujimoto, Saitama (JP); Kinya Mizuno, Saitama (JP); Hiroshi Sotani, Saitama (JP); Hiromi Sumi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 749 days.

(21) Appl. No.: 11/902,343

(22) Filed: Sep. 20, 2007

(65) Prior Publication Data

US 2008/0178695 A1 Jul. 31, 2008

(30) Foreign Application Priority Data

Sep. 29, 2006 (JP) ................................. 2006-270041

(51) Int. Cl.
*F16H 59/00* (2006.01)
*F16H 3/08* (2006.01)
*B62D 61/02* (2006.01)
(52) U.S. Cl. ............ 74/337.5; 74/330; 74/329; 180/230
(58) Field of Classification Search .................... 74/329, 74/330, 331, 333, 334, 335, 337.5, 473.16, 74/478, 478.5; 180/292, 230
See application file for complete search history.

(56) References Cited

U.S. PATENT DOCUMENTS

| 4,093,264 | A * | 6/1978 | Ishihara et al. ............... 280/296 |
| 6,802,233 | B2 * | 10/2004 | Hori et al. .................... 74/730.1 |
| 2005/0211007 | A1 * | 9/2005 | Suzuki et al. ................... 74/340 |
| 2006/0011006 | A1 * | 1/2006 | Suzuki et al. ................. 74/473.1 |
| 2006/0219034 | A1 * | 10/2006 | Hori et al. ......................... 74/330 |
| 2007/0012128 | A1 * | 1/2007 | Janson ............................. 74/325 |
| 2007/0074593 | A1 * | 4/2007 | Mizuno et al. ................... 74/330 |
| 2007/0209460 | A1 * | 9/2007 | Baldwin et al. ................. 74/335 |
| 2008/0078605 | A1 * | 4/2008 | Sotani et al. .................. 180/337 |
| 2008/0081725 | A1 * | 4/2008 | Sotani et al. .................. 475/209 |
| 2008/0087119 | A1 * | 4/2008 | Shiozaki ......................... 74/330 |
| 2008/0314173 | A1 * | 12/2008 | Honma ............................. 74/54 |

FOREIGN PATENT DOCUMENTS

JP 9-317881 A 12/1997

* cited by examiner

*Primary Examiner* — Roger Pang
(74) *Attorney, Agent, or Firm* — Birch, Stewart, Kolasch & Birch, LLP

(57) ABSTRACT

To reduce the engaging sound to a low level, generated at the time of changing over the change gear stage by sliding a shifter, an intermittent feed mechanism includes a drum shifter, a pair of pawls symmetrically mounted to the drum shifter and energized in tilting-up directions, engaging recesses provided at regular intervals along the circumferential direction at the inner periphery of a shift drum center so as to be capable of engagement with both the pawls, and a fixed guide plate for guiding the tilted conditions of both the pawls. The guide plate is provided with a large-diameter arcuate part, a small-diameter arcuate part, and connecting parts. The pawls are engaged with the engaging recesses by the connecting parts, in the course of turning of the drum shifter by a turning amount necessary for changing over the establishment conditions of a plurality of change gear stages of gear trains.

18 Claims, 16 Drawing Sheets

S1: DETERMINE WHETHER OR NOT THE OPERATION OF SHIFTING ELECTRIC MOTOR IS TO BE STARTED

S2: IS POWER SOURCE VOLTAGE NORMAL?

S3: STOP THE OPERATION OF SHIFTING ELECTRIC MOTOR

S4: SHIFT-UP?

S5: SHIFT-UP MODE

S6: SHIFT-DOWN MODE

S11: TURN THE CHANGE SHAFT TO TURNING ANGLE A1

S12: TURN THE CHANGE SHAFT TO TURNING ANGLE A2

S13: HOLD FOR A PREDETERMINED TIME

S14: TURN THE CHANGE SHAFT IN SAME DIRECTION TO TURNING ANGLE A3

S15: EXAMINE THE TURNING ANGLE OF SHIFT DRUM BY DRUM TURNING ANGLE DETECTOR

S16: SLOWLY TURN THE CHANGE SHAFT IN REVERSE DIRECTION

S17: REVERSELY TURN THE CHANGE SHAFT AT NORMAL SPEED

US 7,963,184 B2

VEHICLE TRANSMISSION

CROSS-REFERENCE TO RELATED APPLICATIONS

This nonprovisional application claims priority under 35 U.S.C. § 119(a) on Patent Application No. 2006-270041, filed in Japan on Sep. 29, 2006, the entirety of which is incorporated herein by reference.

BACKGROUND OF THE INVENTION

1. Field of the Invention

The present invention relates to a vehicle transmission including a main shaft to which power from an engine can be transmitted. A counter shaft connected to drive wheels. A plurality of change gear stages of gear trains are provided between the main shaft and the counter shaft. Shifters are relatively non-rotatably and slidably borne on the main shaft or the counter shaft so as to change over the establishment conditions of the gear trains. A shift drum is provided at its outer periphery with lead grooves for engagement with shift forks rotatably holding the shifters. A shift drum center is turned together with the shift drum. An intermittent feed mechanism intermittently turningly drives the shift drum center. The transmission of power from the engine to the main shaft is interrupted when the shifters are slid so as to change over the establishment conditions of the plurality of change gear stages of the gear trains.

2. Background of the Invention

A vehicle transmission, wherein the establishment conditions of a plurality of change gear stage of gear trains are changed over by intermittently turningly driving a shift drum center turned together with a shift drum, has been known as described, for example, in Japanese Patent Laid-open No. Hei 7-317881.

However, the intermittent feed mechanism in the vehicle transmission disclosed in Japanese Patent Laid-open No. Hei 7-317881 is so configured that the drum shifters are turningly driven at the same turning speed by a predetermined angle at the time of changing over the establishment conditions of the plurality of change gear stages of gear trains. Therefore, when the shifters are slid so as to change over the establishment conditions of the gear trains, the difference in speed between the shifter and the gear to be engaged with the shifter would be comparatively large, so that the engaging sound would be large. Particularly, in that type of a vehicle with the change gear stage changed over according to shift-up and shift-down operations in which a preliminary speed change is conducted during running at a change gear stage, a large engaging sound that is not in conjunction with the driver's operation would be generated, making the driver feel a sense of incompatibility.

SUMMARY OF THE INVENTION

The present invention has been made in consideration of the above-mentioned circumstances. Accordingly, it is an object of the present invention to provide a vehicle transmission in which the engaging sound at the time of changing over the change gear stage by sliding a shifter can be suppressed to a low level.

In order to attain the above object, a first aspect of the present invention resides in a vehicle transmission including main shafts to which power from an engine can be transmitted, a counter shaft connected to drive wheels, a plurality of change gear stages of gear trains provided between the main shafts and the counter shaft so as to be capable of selective establishment, shifters relatively non-rotatably and slidably borne on the main shafts or the counter shaft so as to change over the establishment conditions of the gear trains, a shift drum provided at its outer periphery with lead grooves for engagement with shift forks for rotatably holding the shifters, a shift drum center rotated together with the shift drum, and an intermittent feed mechanism for intermittently turningly driving the shift drum center, the transmission of power from the engine to the main shafts being interrupted when the shifters are slid so as to change over the establishment conditions of the plurality of change gear stages of gear trains, wherein the intermittent feed mechanism includes a drum shifter with at least a part thereof disposed in the shift drum center so as to be capable of turning about an axis coaxial with the shift drum center, a pair of pawls symmetrically mounted to the drum shifter so as to be tilted up and down in radial directions of the drum shifter, a pair of springs for respectively energizing the pawls in tilting-up directions, a plurality of engaging recesses provided at regular intervals along the circumferential direction at an inner periphery of the shift drum center so that both the pawls can be engaged therewith, and a fixed guide plate for guiding from the radially outer side the tilted conditions of both the pawls according to the turning of the drum shifter; the guide plate is provided with a large-diameter arcuate part and a small-diameter arcuate part, and connecting parts connecting the large-diameter arcuate part and the small-diameter arcuate part to each other; and the connecting parts are so formed as to engage the pawls with the engaging recesses in the course of turning of the drum shifter by a turning amount necessary for changing over the establishment conditions of the plurality of change gear stages of gear trains.

In addition, a second aspect of the present invention resides in a vehicle transmission including first and second main shafts disposed coaxially so that power from an engine can be transmitted thereto, a counter shaft connected to drive wheels, a plurality of change gear stages of gear trains provided between the first and second main shafts and the counter shaft so as to be capable of selective establishment, a shifter relatively non-rotatably and slidably disposed on the first main shaft so as to change over the establishment conditions of the gear trains, provided between the first main shaft and the counter shaft, of the gear trains, a shift drum provided at its outer periphery with a lead groove for engagement with a shift fork for rotatably holding the shifter, a shift drum center turned together with the shift drum, and an intermittent feed mechanism for intermittently turningly driving the shift drum center, the transmission of power from the engine to the first main shaft being interrupted in the condition where power from the engine is transmitted to the second main shaft when the shifter is slid so as to change over the establishment conditions of said gear trains between the first main shaft and the counter shaft, wherein the intermittent feed mechanism includes a drum shifter with at least a part thereof disposed in the shift drum center so as to be capable of turning about an axis coaxial with the shift drum center, a pair of pawls symmetrically mounted to the drum shifter so as to be tilted up and down in radial directions of the drum shifter, a pair of springs for respectively energizing the pawls in tilting-up directions, a plurality of engaging recesses provided at regular intervals along the circumferential direction at an inner periphery of the shift drum center so that both the pawls can be engaged therewith, and a fixed guide plate for guiding from the radially outer side the tilted conditions of both the pawls according to the turning of the drum shifter; the guide plate is provided with a large-diameter arcuate part and a small-diameter arcuate part, and connecting parts connecting the large-diameter arcuate part and the small-diameter arcuate part to each other; and the connecting parts are so formed as to engage the pawls with the engaging recesses in the course of turning of the drum shifter by a turning amount necessary for changing over the establishment conditions of the plurality of change gear stages of gear trains.

Furthermore, a third aspect of the present invention resides in a vehicle transmission including first and second main shafts disposed coaxially so that power from an engine can be transmitted thereto, a counter shaft connected to drive wheels, a plurality of change gear stages of gear trains provided between the first and second main shafts and the counter shaft so as to be capable of selective establishment, a shifter relatively non-rotatably and slidably disposed on the counter shaft so as to change over the establishment conditions of the gear trains, provided between the second main shaft and the counter shaft, of the gear trains, a shift drum provided at its outer periphery with a lead groove for engagement with a shift fork for rotatably holding the shifter, a shift drum center turned together with the shift drum, and an intermittent feed mechanism for intermittently turningly driving the shift drum center, the transmission of power from the engine to the second main shaft being interrupted in the condition where power from the engine is transmitted to the first main shaft when the shifter is slid so as to change over the establishment conditions of the gear trains between the second main shaft and the counter shaft, wherein the intermittent feed mechanism includes a drum shifter with at least a part thereof disposed in the shift drum center so as to be capable of turning about an axis coaxial with the shift drum center, a pair of pawls symmetrically mounted to the drum shifter so as to be tilted up and down in radial directions of the drum shifter, a pair of springs for respectively energizing the pawls in tilting-up directions, a plurality of engaging recesses provided at regular intervals along the circumferential direction at an inner periphery of the shift drum center so that both the pawls can be engaged therewith, and a fixed guide plate for guiding from the radially outer side the tilted conditions of both the pawls according to the turning of the drum shifter; the guide plate is provided with a large-diameter arcuate part and a small-diameter arcuate part, and connecting parts connecting the large-diameter arcuate part and the small-diameter arcuate part to each other; and the connecting parts are so formed as to engage the pawls with the engaging recesses in the course of turning of the drum shifter by a turning amount necessary for changing over the establishment conditions of the plurality of change gear stages of gear trains.

According to the first aspect of the present invention, when the shifter rotated together with the main shaft or the counter shaft is slid so as to change over the establishment conditions of the gear trains, the guide plate engages the pawl with the engaging recess to thereby once slow down the turning speed of the shift drum, i.e., the sliding speed of the shifter, whereby the timing of engagement of the shifter with a gear in the gear train on the side of being to be put into the established condition can be retarded. As a result, it is possible to reduce the difference in speed between the shifter and the gear to be engaged with the shifter down to a comparatively small value, and thereby to prevent the engaging sound from becoming large.

In addition, according to the second aspect of the present invention, when the shifter rotated together with the first main shaft is slid so as to change over the establishment conditions of the gear trains in the condition where the transmission of power from the engine to the first main shaft is interrupted and where power from the engine is transmitted to the second main shaft, the guide plate engages the pawl with the engaging recess to thereby once slow down the turning speed of the shift drum, i.e., the sliding speed of the shifter, whereby the timing of engagement of the shifter with a gear in the gear train on the side of being to be put into the established condition can be retarded. Therefore, in the condition where both idle gears are rotating due to establishment of the gear train provided between the second main shaft and the counter shaft, it is possible to reduce to a comparatively small value the relative rotating speed difference between the rotating speed of the shifter rotated along with an attendant rotation of the first main shaft due to a bearing provided between the first and second main shaft or the viscosity of a lubricating oil and that of a gear with which the shifter is about to be engaged, and it is therefore possible to prevent the engaging sound from becoming large.

Furthermore, according to the third aspect of the present invention, when the shifter rotated together with the counter shaft is slid so as to change over the establishment conditions of the gear trains under the condition where the transmission of power from the engine to the second main shaft is interrupted and where power from the engine is transmitted to the first main shaft, the guide plate engages the pawl with the engaging recess to thereby once slow down the turning speed of the shift drum, i.e., the sliding speed of the shifter, whereby the timing of engagement of the shifter with a gear in the gear train on the side of being to be put into the established condition can be retarded. Therefore, in the condition where both idle gears are rotating due to the establishment of the gear train provided between the second main shaft and the counter shaft, a gear in the gear train about to be put into an established condition is rotated along with an attendant rotation of the second main shaft due to a bearing provided between the first and second main shafts or the viscosity of a lubricating oil, but it is possible to reduce to a comparatively small value the relative rotating speed difference between the rotating speed of the gear and that of the shifter, and it is possible therefore to prevent the engaging sound from becoming large.

According to the fourth aspect of the present invention, it is possible to once slowing down the turning of the shift drum in the non-established conditions of the gear trains.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
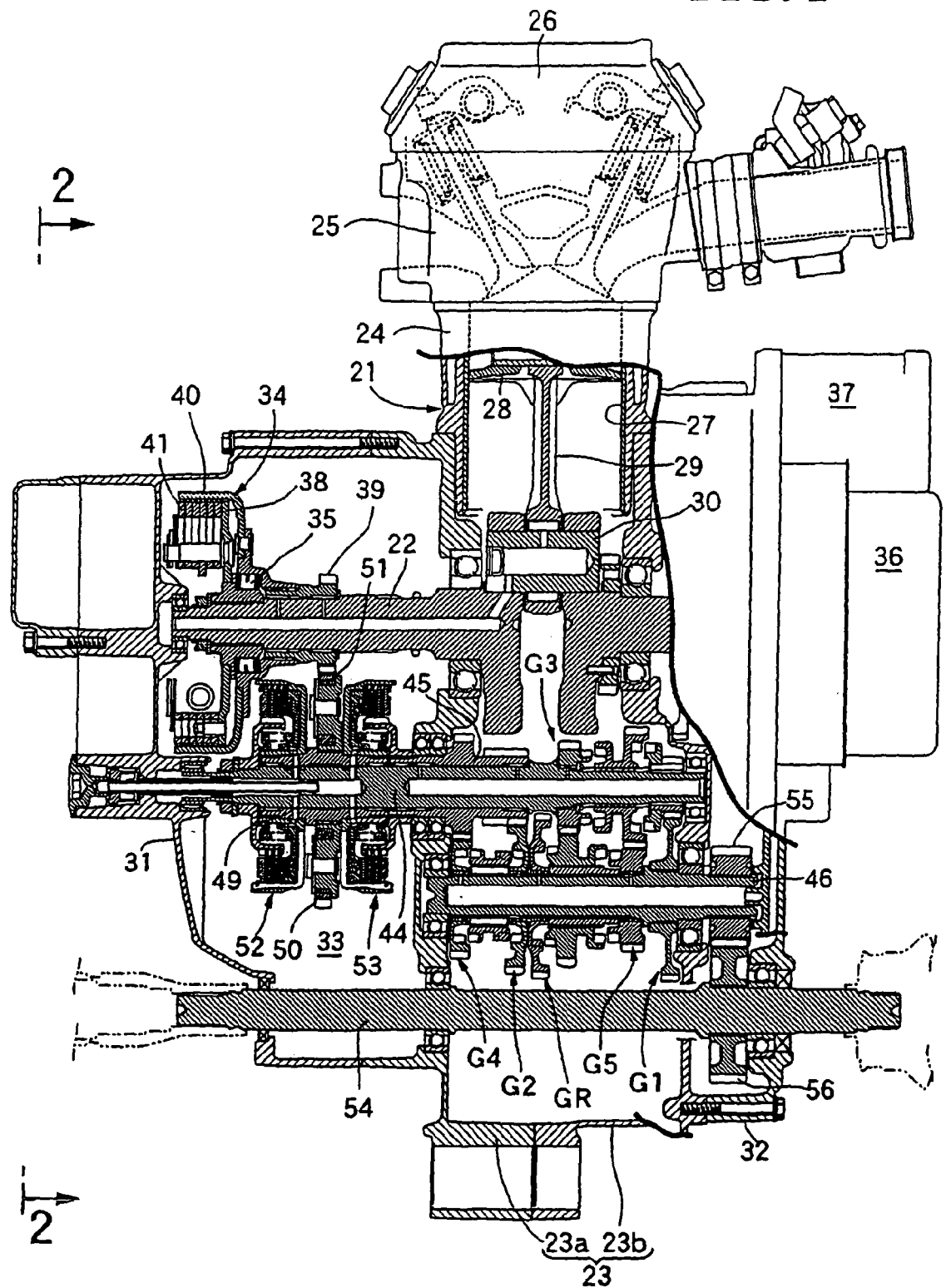
FIG. 1 is a vertical sectional view of an engine body in a first embodiment, and is a sectional view taken along line 1-1 of FIG. 2.

The present invention will now be described in detail with reference to the accompanying drawings, wherein the same reference numerals will be used to identify the same or similar elements throughout the several views. It should be noted that the drawings should be viewed in the direction of orientation of the reference numerals.

Figure 2:
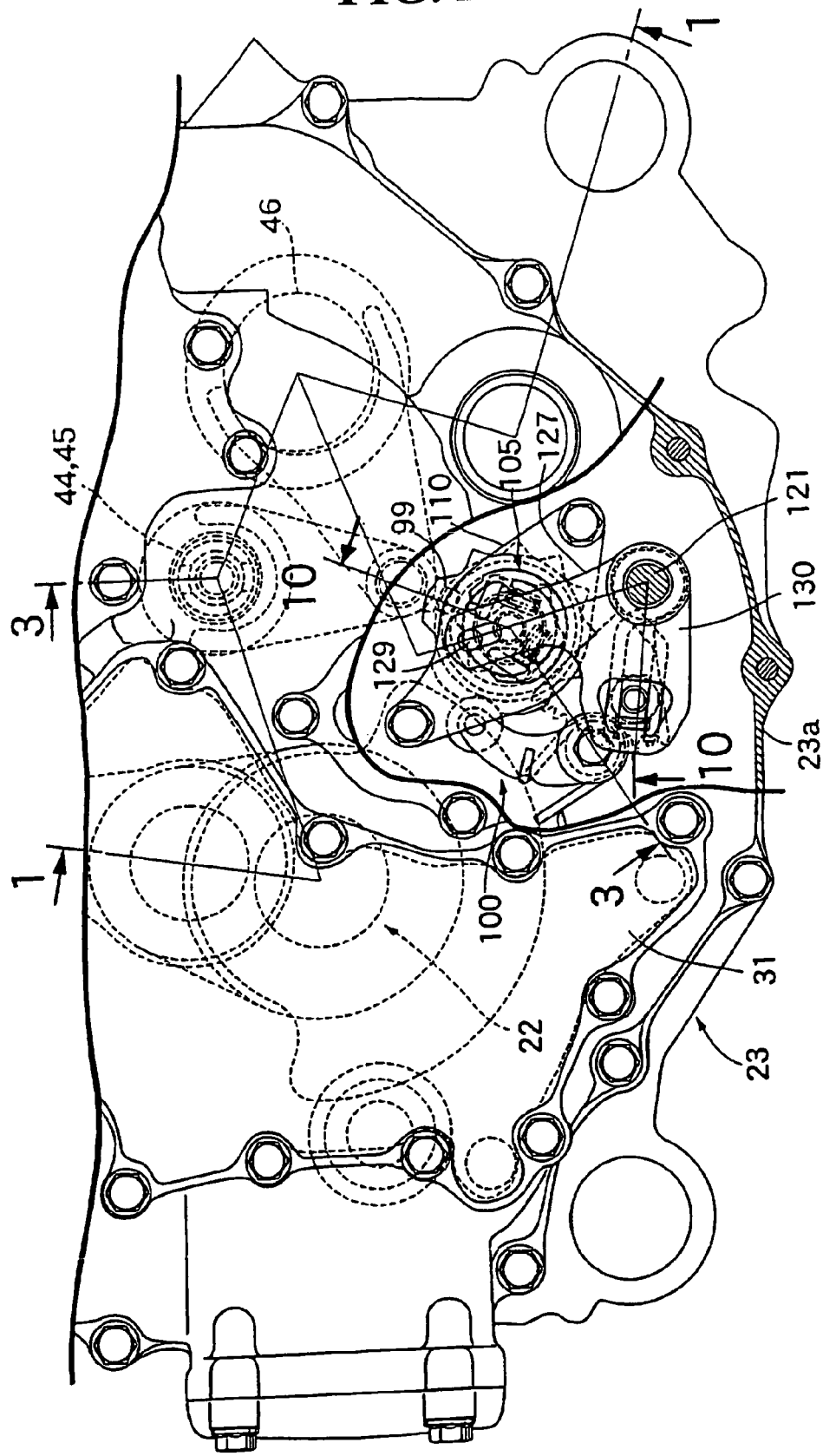
FIG. 2 is a partly broken side view taken along arrows of line 2-2 of FIG. 1.
Figure 3:
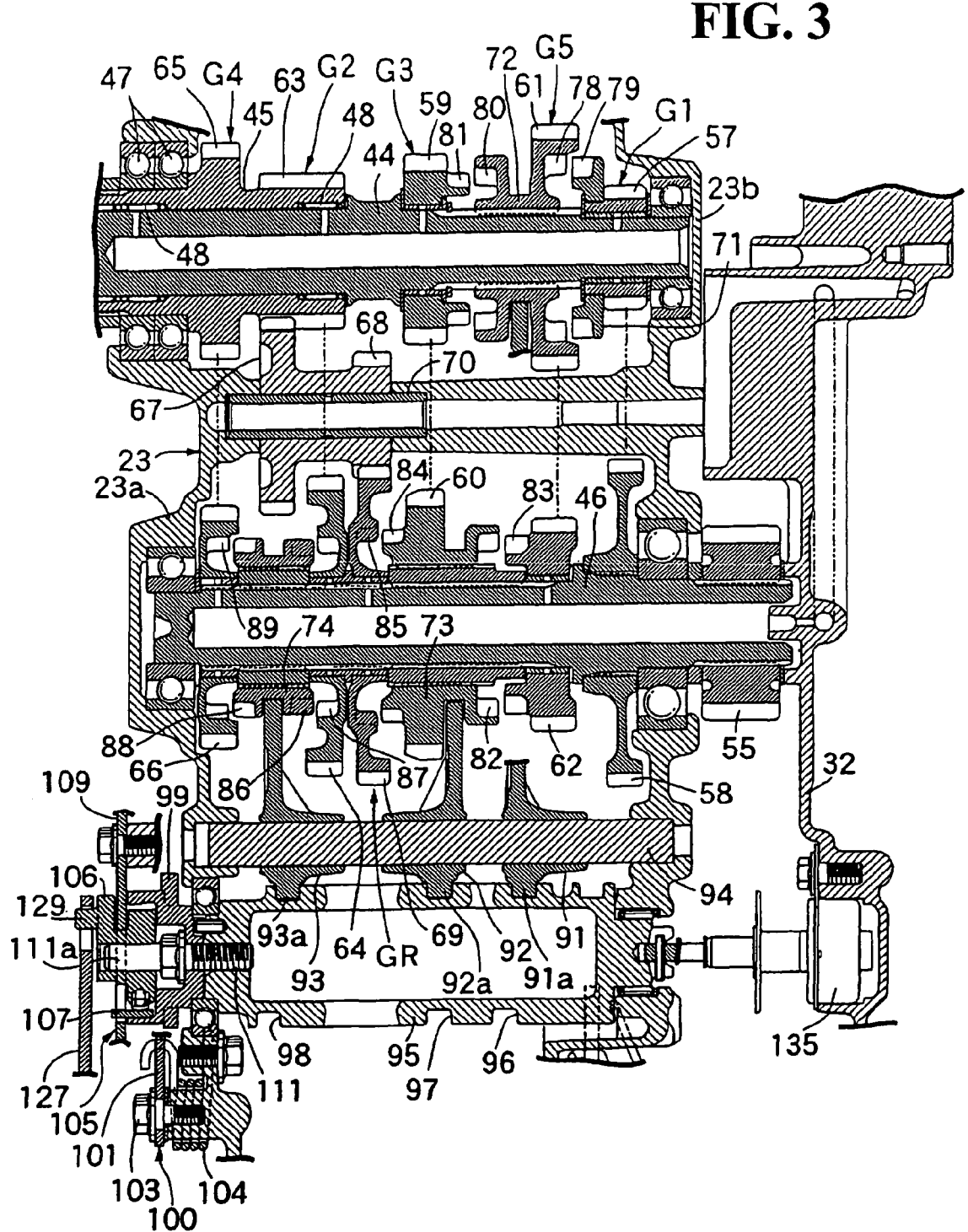
FIG. 3 is a sectional view taken along line 3-3 of FIG. 2.
Figure 4:
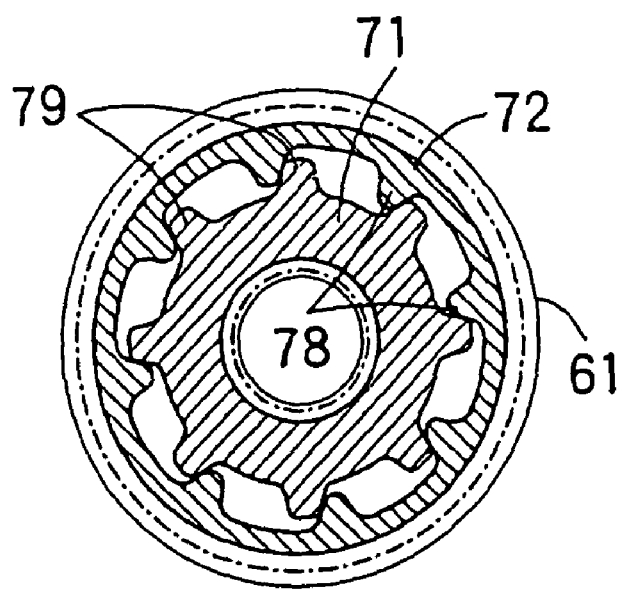
FIG. 4 is a cross-sectional view showing an engaged condition of a first shifter and an engaged member.
Figure 5:
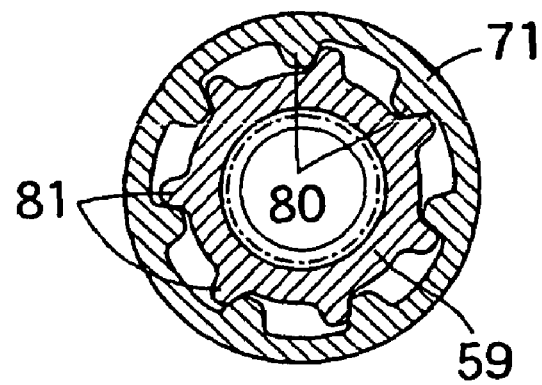
FIG. 5 is a cross-sectional view showing an engaged condition of the first shifter and a 3rd-speed drive idle gear.
Figure 6:
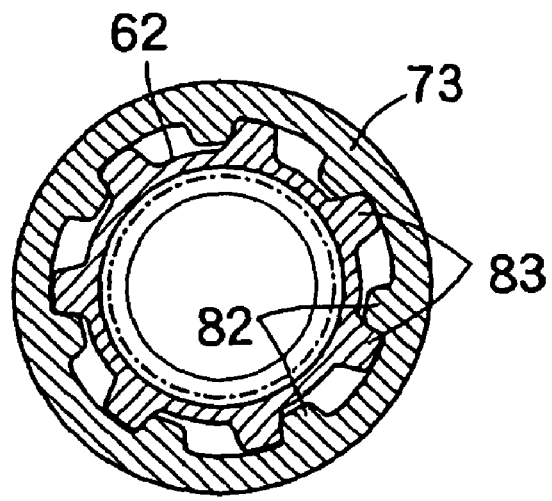
FIG. 6 is a cross-sectional view showing an engaged condition of a second shifter and a 5th-speed driven idle gear.
Figure 7:
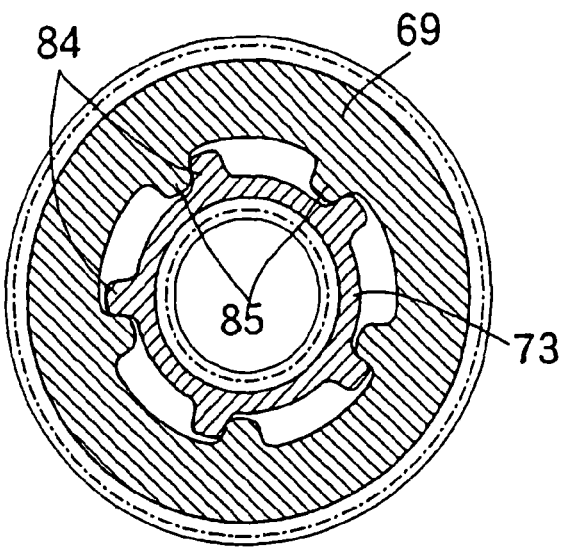
FIG. 7 is a cross-sectional view showing an engaged condition of the second shifter and a reverse driven idle gear.
Figure 8:
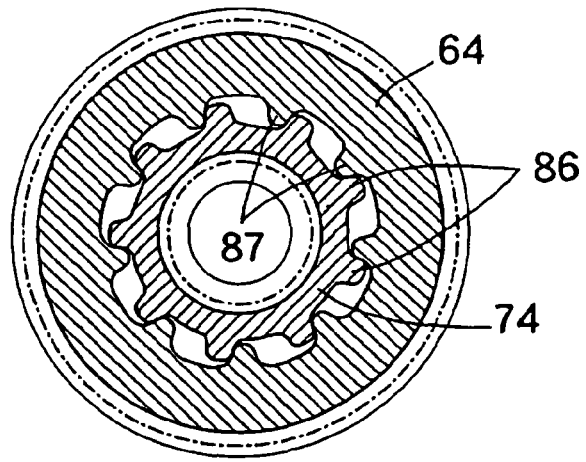
FIG. 8 is a cross-sectional view showing an engaged condition of a third shifter and a 2nd-speed driven idle gear.
Figure 9:
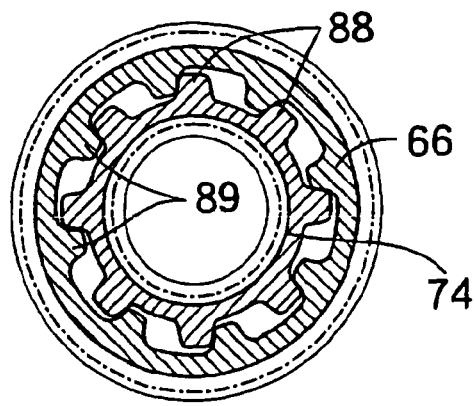
FIG. 9 is a cross-sectional view showing an engaged condition of the third shifter and a 4th-speed driven idle gear.
Figure 10:
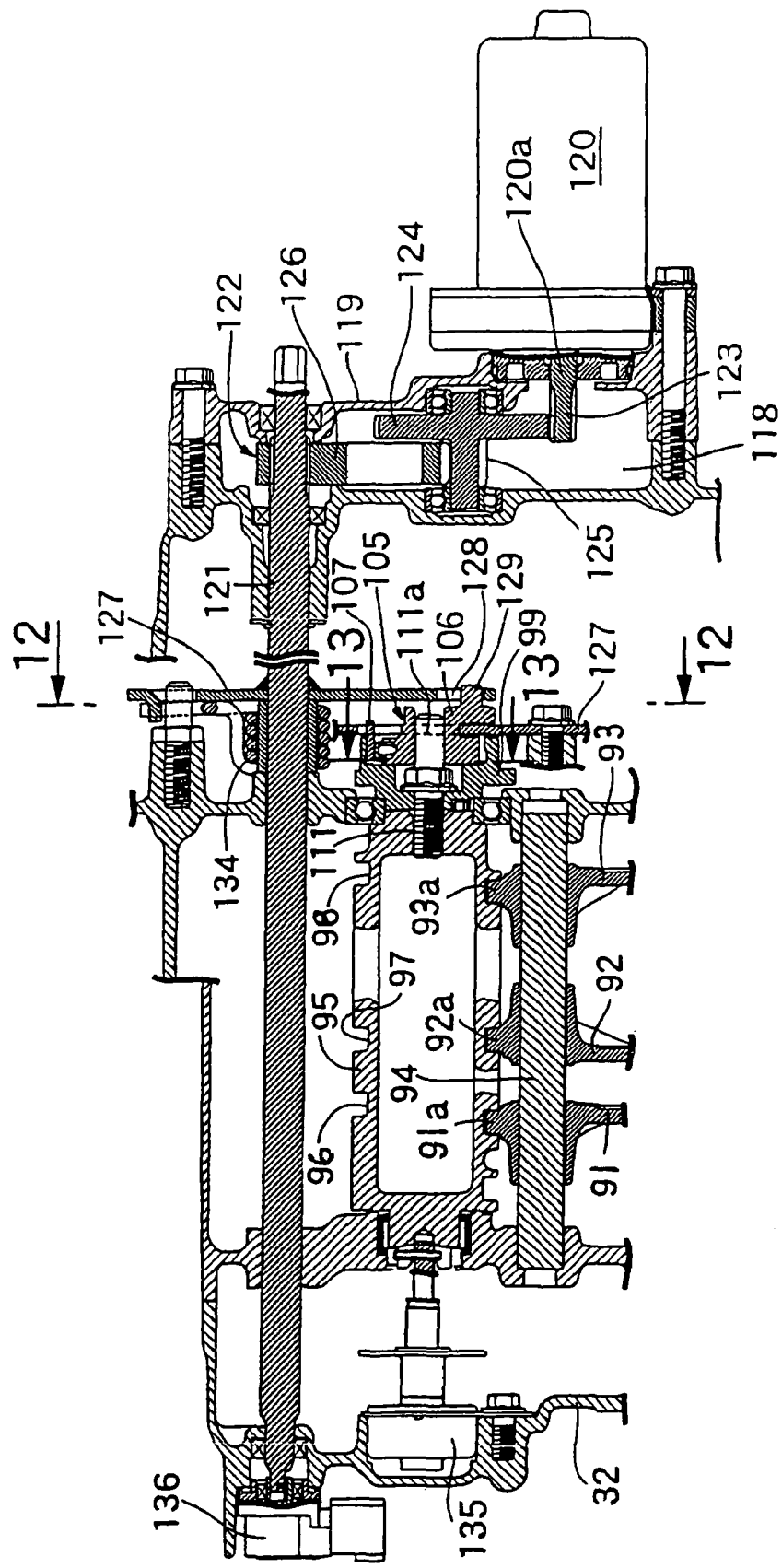
FIG. 10 is a sectional view taken along line 10-10 of FIG. 2.
Figure 11:
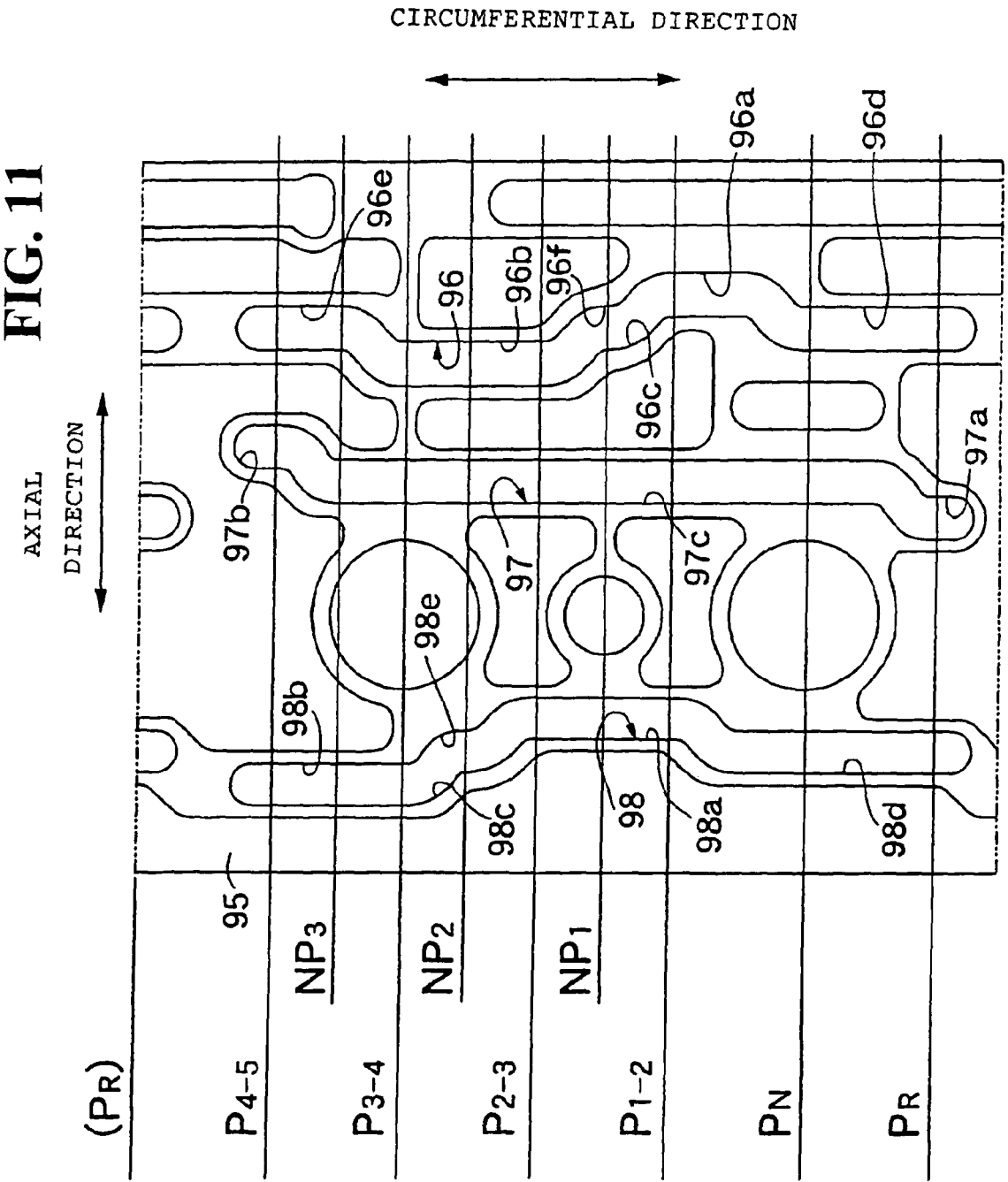
FIG. 11 is a development of an outer peripheral surface of a shift drum.
Figure 12:
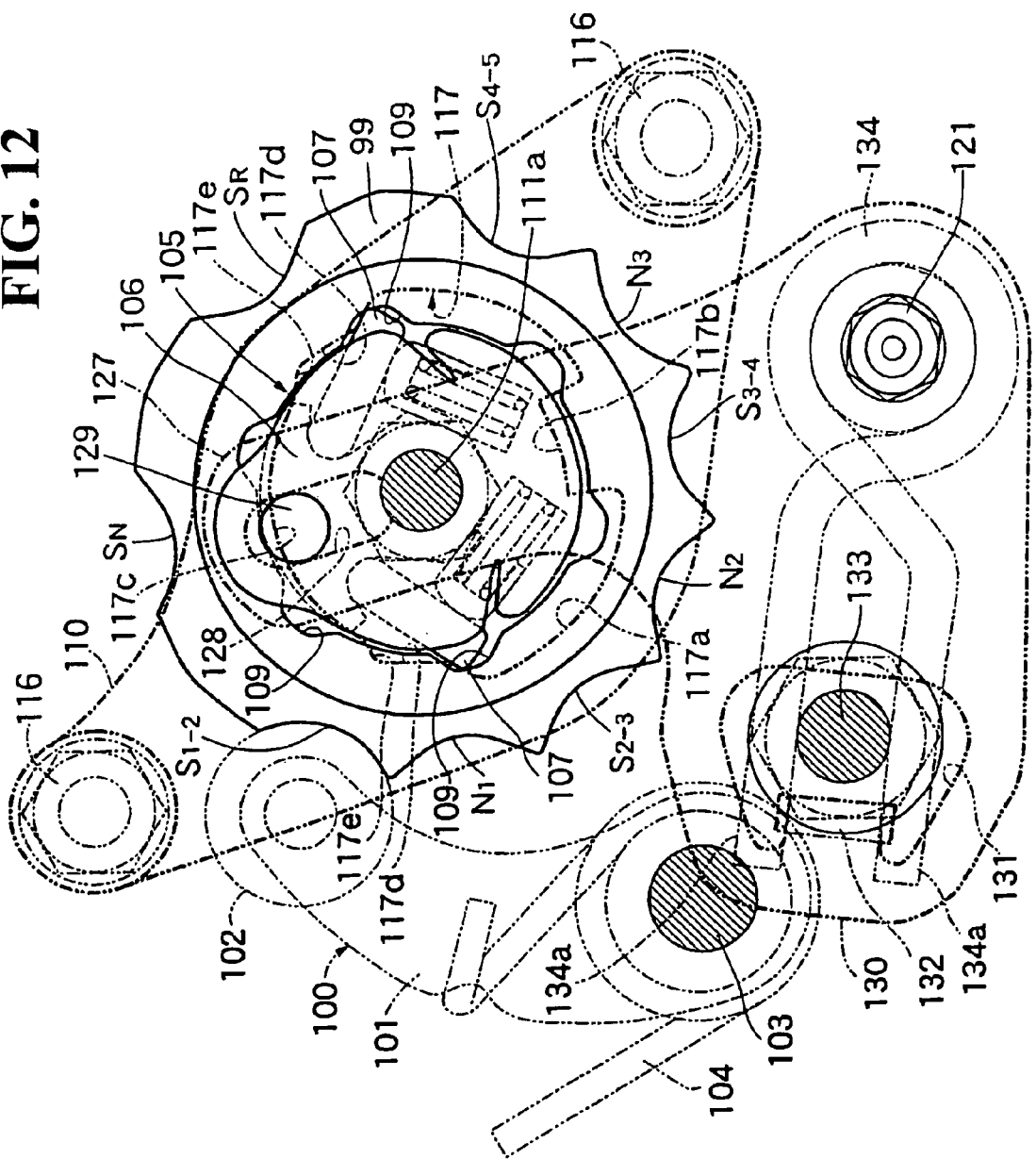
FIG. 12 is a sectional view taken along line 12-12 of FIG. 10, in a 1st-speed operating condition.
Figure 13:
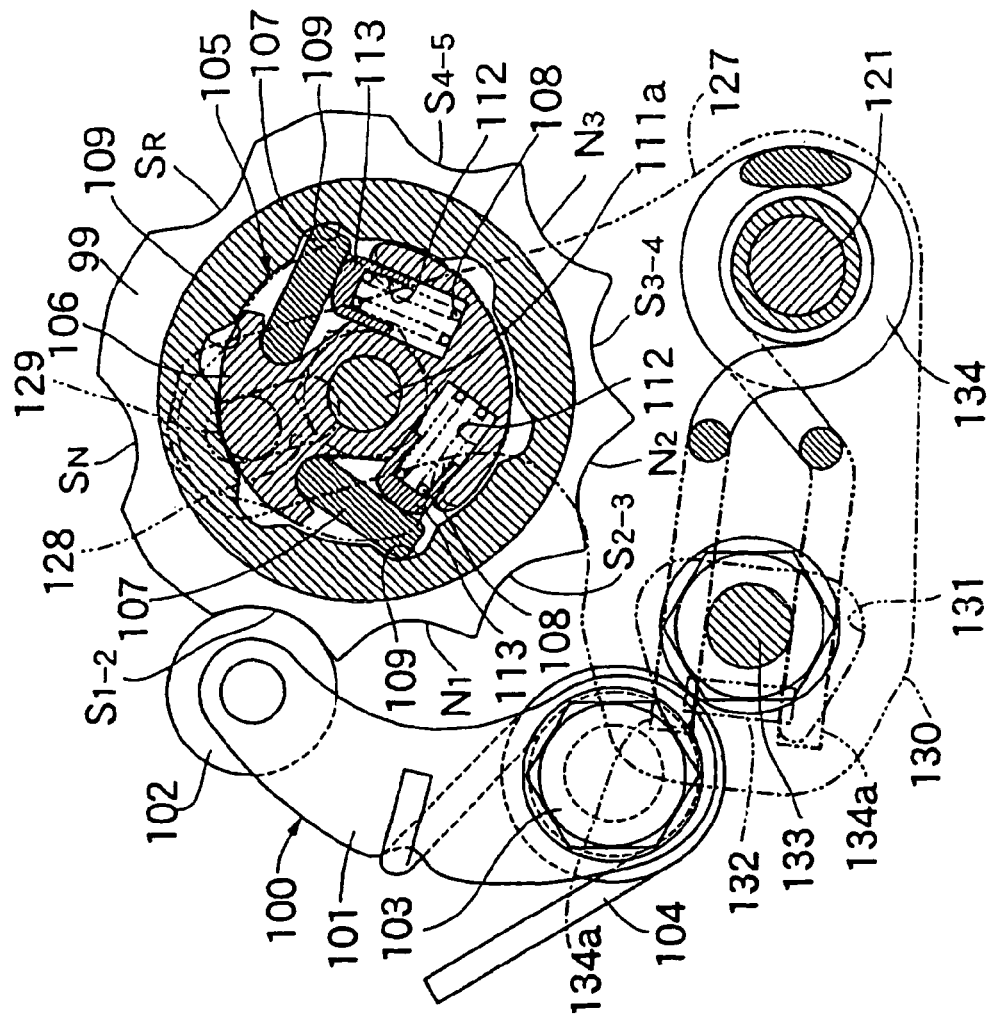
FIG. 13 is an enlarged sectional view taken along line 13-13 of FIG. 10, in the 1st-speed operating condition.
Figure 14:
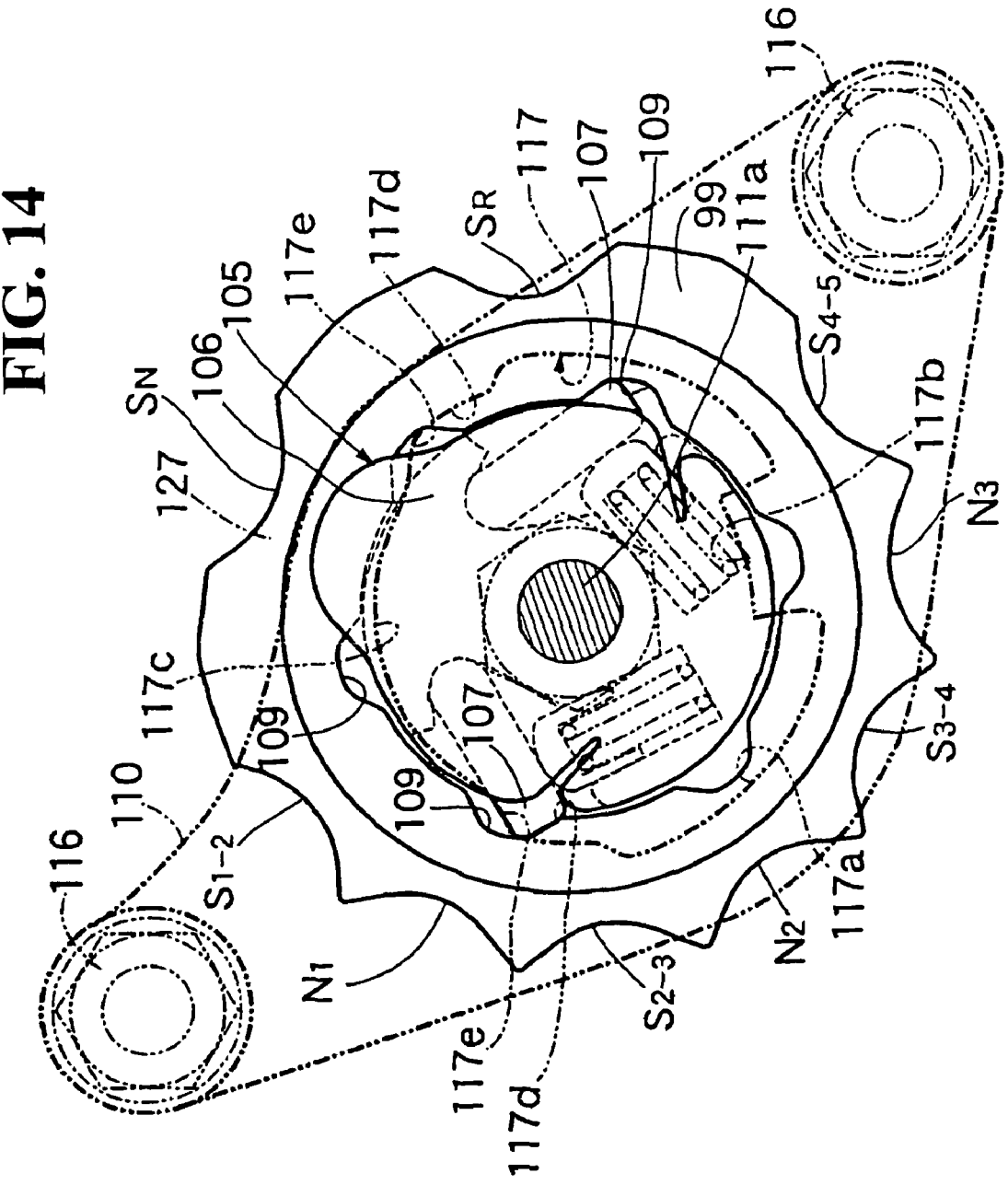
FIG. 14 is a view showing the condition of a part of a feed mechanism in the course of turning of a shift drum center.
Figure 15:
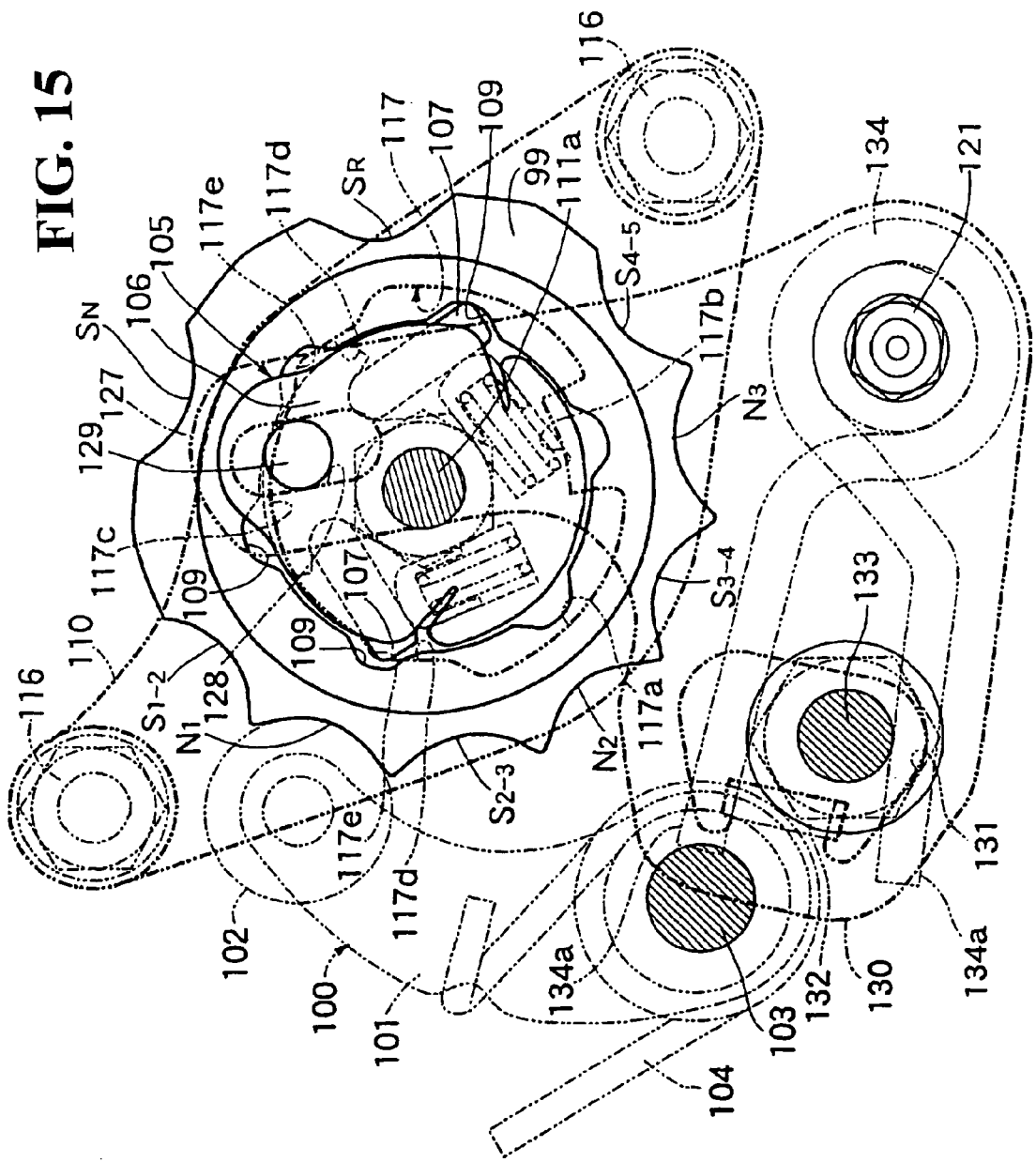
FIG. 15 is a view corresponding to FIG. 12, in the condition in the course of shift-up from the 1st-speed to the 2nd-speed.
Figure 16:
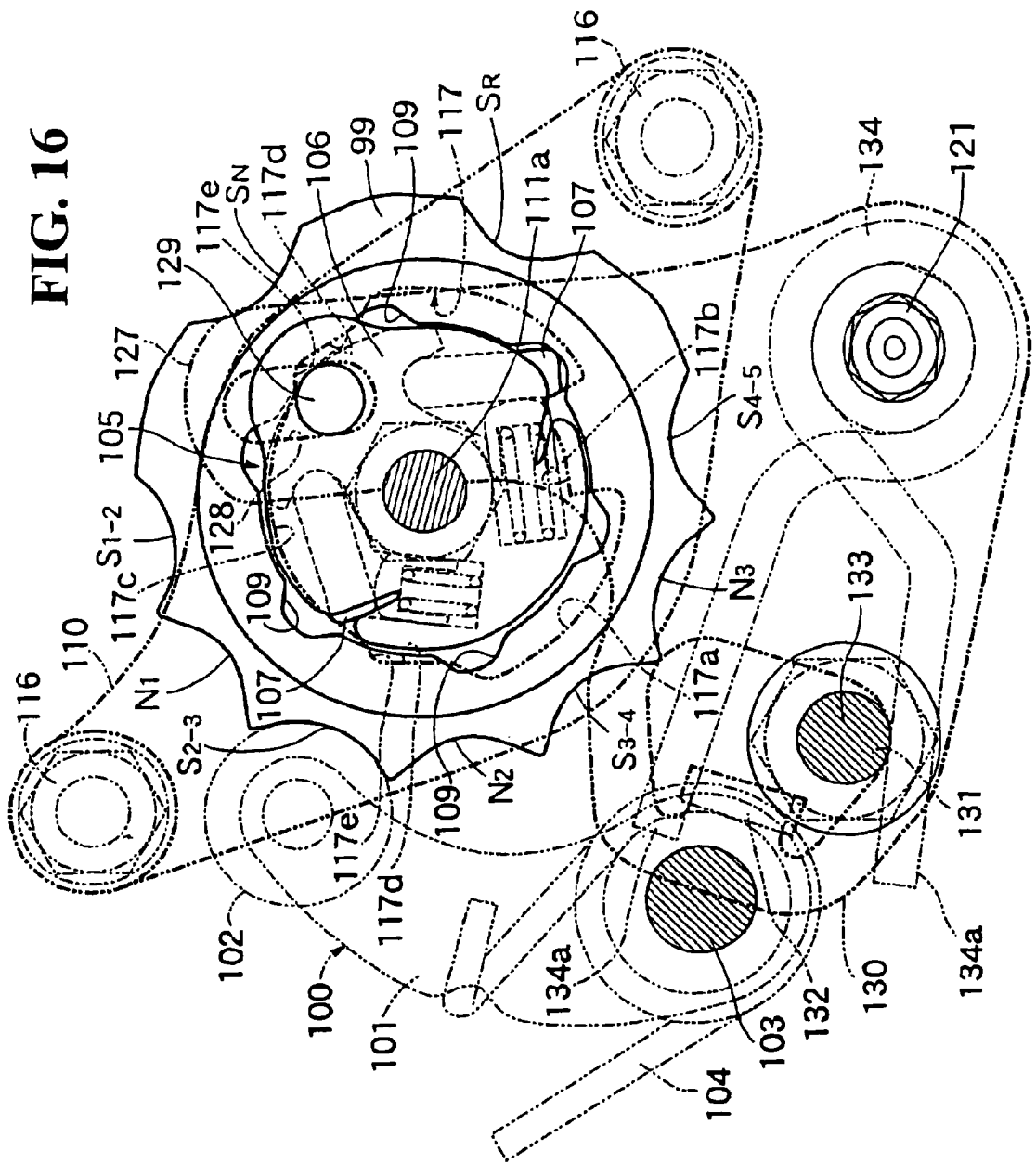
FIG. 16 is a view corresponding to FIG. 12, in a 2nd-speed operating condition.
Figure 17:
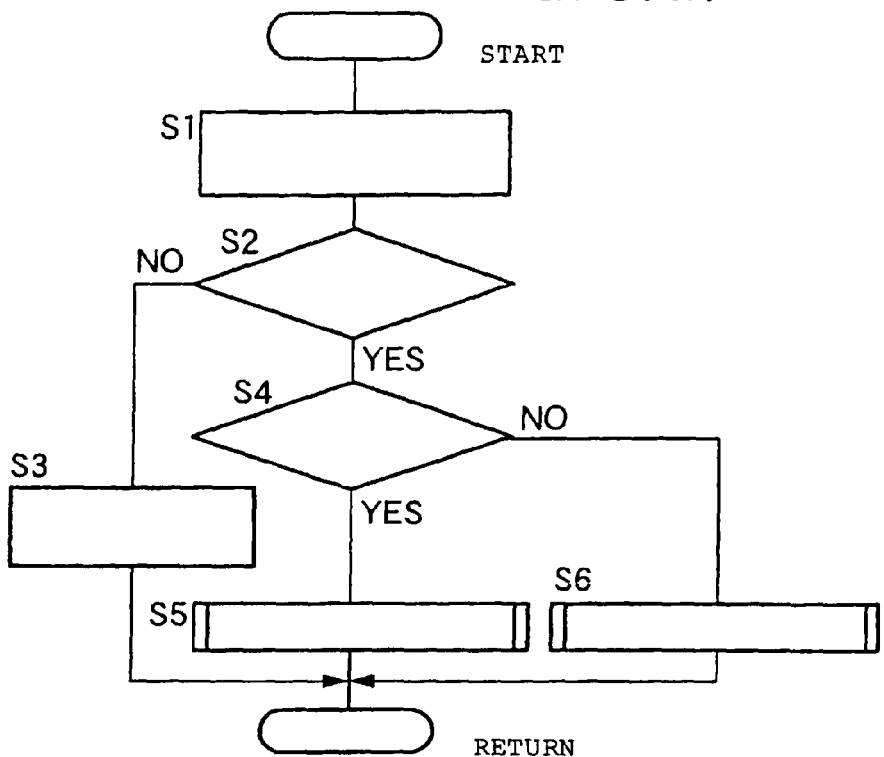
FIG. 17 is a flow chart showing an operation control procedure for a shifting operating motor.
Figure 18:
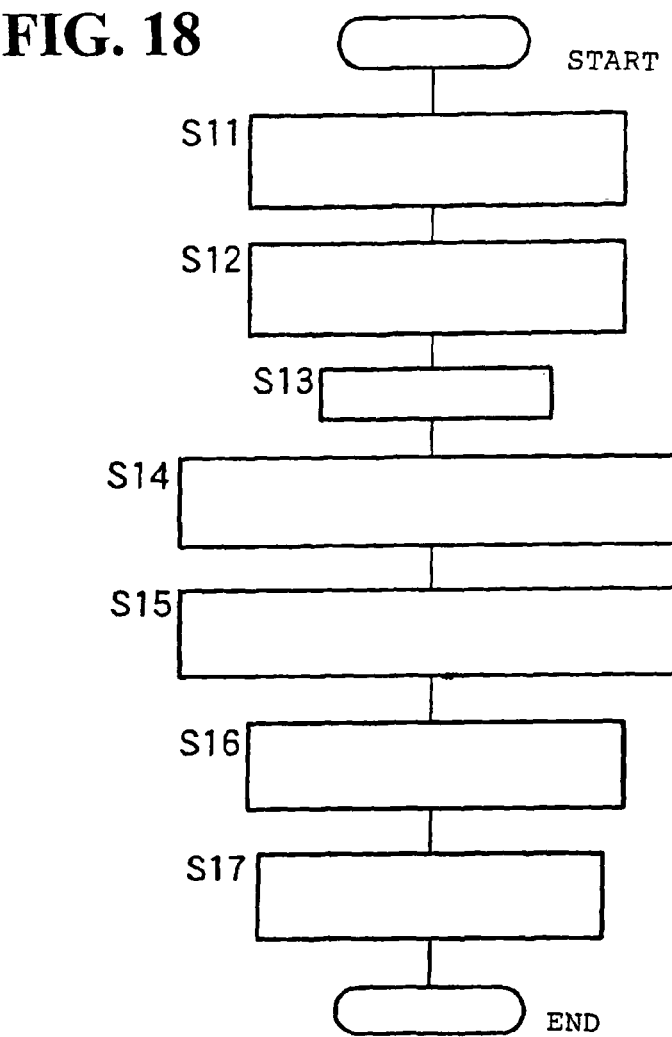
FIG. 18 is a flow chart showing a control procedure in a shift-up mode.
Figure 19:
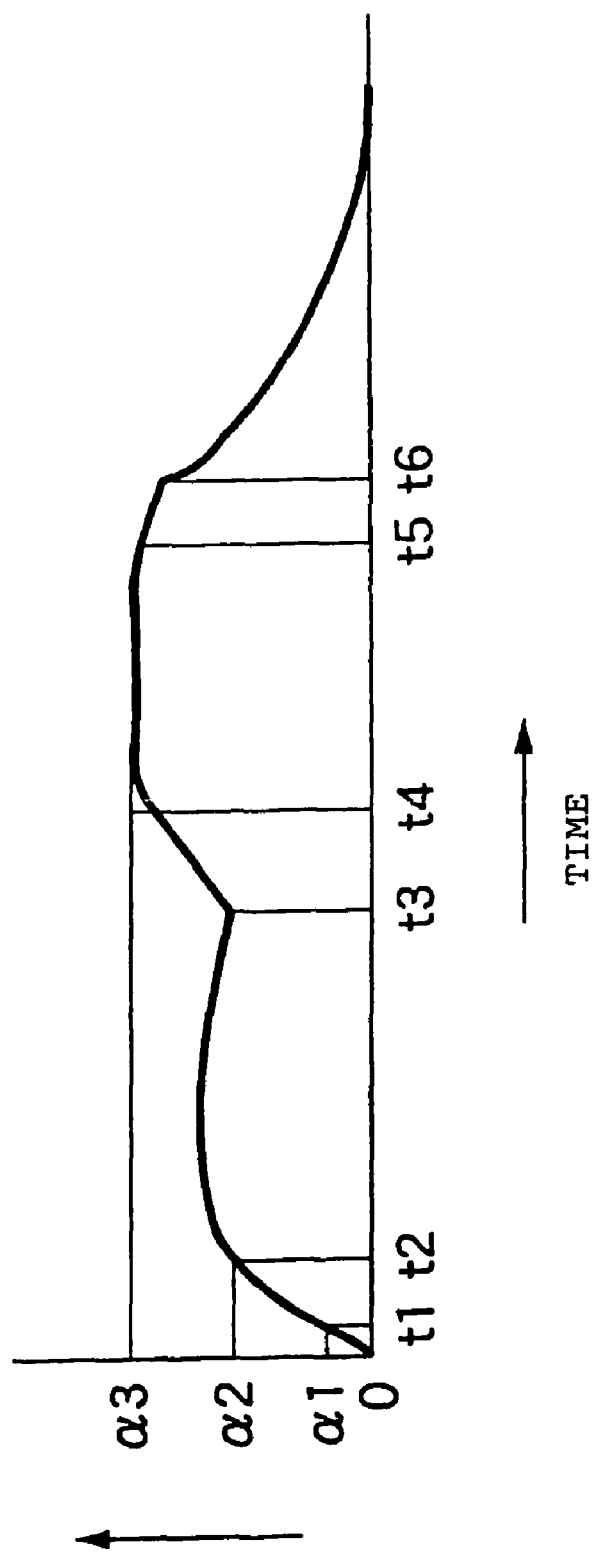
FIG. 19 is a diagram showing the variation in the turning angle of a change shaft at the time of shift-up.

FIGS. 1 to 19 illustrate a first embodiment of the present invention, wherein FIG. 1 is a vertical sectional view of an engine body and is a sectional view taken along line 1-1 of FIG. 2; FIG. 2 is a partly broken side view taken along arrows of line 2-2 of FIG. 1; FIG. 3 is a sectional view taken along line 3-3 of FIG. 2; FIG. 4 is a cross-sectional view showing an engaged condition of a first shifter and an engaged member; FIG. 5 is a cross-sectional view showing an engaged condition of the first shifter and a 3rd-speed drive idle gear; FIG. 6 is a cross-sectional view showing an engaged condition of a second shifter and a 5th-speed driven idle gear; FIG. 7 is a cross-sectional view showing an engaged condition of the second shaft and a reverse driven idle gear; FIG. 8 is a cross-sectional view showing an engaged condition of a third shifter and a 2nd-speed driven idle gear; FIG. 9 is a cross-sectional view showing an engaged condition of the third shifter and a 4th-speed driven idle gear; FIG. 10 is a sectional view taken along line 10-10 of FIG. 2; FIG. 11 is a development of an outer peripheral surface of a shift drum; FIG. 12 is a sectional view taken along line 12-12 of FIG. 10; FIG. 13 is an enlarged sectional view taken along line 13-13 of FIG. 10, in a 1st-speed operating condition; FIG. 14 is a view showing the condition of a part of a feed mechanism in the course of turning of a shift drum center; FIG. 15 is a view corresponding to FIG. 12, in the condition in the course of shift-up from the 1st-speed stage to the 2nd-speed stage; FIG. 16 is a view corresponding to FIG. 12, in a 2nd-speed operating condition;

FIG. 17 is a flow chart showing an operation control procedure for a shifting operating motor; FIG. 18 is a flow chart showing a control procedure in a shift-up mode; and FIG. 19 is a diagram showing the variation in the turning angle of a change shaft at the time of shift-up.

First, in FIG. 1, an engine body 21 of an engine E mounted, for example, on an all-terrain vehicle includes a crankcase 23 turnably bearing a crankshaft 22 having an axis set along the vehicle width direction (the direction parallel to the surface of sheet of FIG. 1). A cylinder block 24 is connected to an upper part of the crankcase 23. A cylinder head 25 is connected to an upper part of the cylinder block 24. A head cover 26 is connected to an upper part of the cylinder head 25. A piston 28 slidably fitted in a cylinder bore 27 in the cylinder block 24 is connected to the crankshaft 22 through a connecting rod 29 and a crank pin 30.

The crankcase 23 is composed of a pair of case halves 23a and 23b coupled to each other at a plane orthogonal to the rotational axis of the crankshaft 22. First and second crankcase covers 31 and 32 are fastened respectively to both sides of the crankcase 23. A clutch containing chamber 33 is formed between the crankcase 23 and the first crankcase cover 31.

One end of the crankshaft 22 protruding from the crankcase 23 is rotatably borne on the first crankcase cover 31. At a position close to the first crankcase cover 31, a centrifugal clutch 34 contained in the clutch containing chamber 33 is mounted to one end part of the crankshaft 22 through a one-way clutch 35. A generator (not shown) disposed between the crankcase 23 and the second crankcase cover 32 is connected to the other end part of the crankshaft 22 protruding from the crankcase 23. A recoil starter 36 attached to the second crankcase cover 32 is also connected to the other end part of the crankshaft 22. In addition, a starter motor 37 for inputting starting power to the crankshaft 22 is attached to the second crankcase cover 32.

The centrifugal clutch 34 includes a drive plate 38 fixed to the crankshaft 22. A cup-shaped clutch housing 40 coaxially covers the drive plate 38 so as to rotate together with a drive gear 39 relatively rotatably mounted on the crankshaft 22. A clutch weight 41 is turnably supported by the drive plate 38 so as to be capable of frictional engagement with the inner periphery of the clutch housing 40 according to the action of a centrifugal force attendant on the rotation of the crankshaft 22. The one-way clutch 35 is provided between the clutch housing 40 and the drive plate 38 so as to enable transmission of power from the drive gear 39 to the crankshaft 22.

Referring to FIGS. 2 and 3 also, first and second main shafts 44 and 45 disposed coaxially so as to be capable of relative rotation about the same axis are borne on the crankcase 23 so as to be capable of rotation about an axis parallel to the rotational axis of the crankshaft 22. Also, a counter shaft 46 that is parallel to the first and second main shafts 44 and 45 is rotatably mounted on the crankcase 23. In addition, a plurality of change gear stages of gear trains that are capable of selective establishment are provided between the first and second main shafts 44, 45 and the counter shaft 46. In this embodiment, a 1st-speed gear train G1, a 3rd-speed gear train G3 and a 5th-speed gear train G5 are provided between the first main shaft 44 and the counter shaft 46, whereas a 2nd-speed gear train G2, a 4th-speed gear train G4 and a reverse gear train GR are provided between the second main shaft 45 and the counter shaft 46.

Besides, the first main shaft 44 coaxially penetrates, in a relatively rotatable manner, the second main shaft 45 rotatably borne on the crankcase 23 through ball bearings 47, 47.

A plurality of needle bearings 48 are interposed between the second main shaft 45 and the first main shaft 44.

In the clutch containing chamber 33, a power transmitting tubular shaft 49 is relatively rotatably mounted on the first main shaft 44. Power is transmitted to the power transmitting tubular shaft 49 by way of the drive gear 39 relatively rotatably mounted on the crankshaft 22, a driven gear 50 meshed with the drive gear 39, and a rubber damper 51. In addition, a first hydraulic clutch 52 is provided between the power transmitting tubular shaft 49 and the first main shaft 44, and a second hydraulic clutch 53 is provided between the power transmitting tubular shaft 49 and the second main shaft 45.

When the first hydraulic clutch 52 is in a power transmitting condition such as to transmit power from the crankshaft 22 to the first main shaft 44, power is transmitted from the first main shaft 44 to the counter shaft 46 by way of an alternatively established one of the 1st-speed, 3rd-speed and 5th-speed gear trains G1, G3 and G5. When the second hydraulic clutch 53 is in a power transmitting condition such as to transmit power from the crankshaft 22 to the second main shaft 45, power is transmitted from the second main shaft 45 to the counter shaft 46 by way of an alternatively established one of the 2nd-speed, 4th-speed and reverse gear trains G2, G4 and GR.

As shown in FIG. 1, an output shaft 54 connected to drive wheels (not shown) and having an axis parallel to the rotational axis of the crankshaft 22 is rotatably borne by one 23a of both the case halves 23a, 23b of the crankcase 23 and the second crankcase cover 32. Both ends of the output shaft 54 respectively penetrate the first and second crankcase covers 31 and 32, in a liquid-tight manner, to protrude to the exterior. On the other hand, a drive gear 55 is fixed to an end part of the counter shaft 46 protruding from the other 23b of both the case halves 23a and 23b of the crankcase 23, and a driven gear 56 meshed with the drive gear 55 is provided on the output shaft 54. In other words, the counter shaft 46 is connected to the output shaft 54 through the drive gear 55, the driven gear 56 and the output shaft 54.

Paying attention to FIG. 3, the 1st-speed gear train G1 is composed of a 1st-speed drive idle gear 57 relatively rotatably borne on the first main shaft 44 so that its position in the axial direction is fixed. A 1st-speed driven gear 58 is relatively non-rotatably connected to the counter shaft 46 and is meshed with the 1st-speed drive idle gear 57. The 3rd-speed gear train G3 is composed of a 3rd-speed drive idle gear 59 relatively rotatably bone on the first main shaft 44 so that its position in the axial direction is fixed. A 3rd-speed driven gear 60 is relatively non-rotatably connected to the counter shaft 46 and is meshed with the 3rd-speed drive idle gear 59. In addition, the 5th-speed gear train G5 is composed of a 5th-speed drive gear 61, which is disposed between the 1st-speed and 3rd-speed drive idle gears 57 and 59 so as to be capable of sliding in the axial direction and which is relatively non-rotatably connected to the first main shaft 44. A 5th-speed driven idle gear 62 is relatively rotatably borne on the counter shaft 46 with its position in the axial direction fixed and is meshed with the 5th-speed drive gear 61.

The 2nd-speed gear train G2 is composed of a 2nd-speed drive gear 63 provided as one body with the second main shaft 45. A 2nd-speed driven idle gear 64 is rotatably borne on the counter shaft 46 with its position in the axial direction fixed and is meshed with the 2nd-speed drive gear 63. The 4th-speed gear train G4 is composed of a 4th-speed drive gear 65 provided as one body with the second main shaft 45. A 4th-speed driven idle gear 66 is relatively rotatably borne on the counter shaft 46 with its position in the axial direction fixed and is meshed with the 4th-speed drive gear 65. In addition, the reverse gear train GR is composed of the 2nd-speed drive gear 63, a first reverse idle gear 67 meshed with the 2nd-speed drive idle gear 63, a second reverse idle gear 68 formed as one body with the first reverse idle gear 67, and a reverse idle gear 69 which is relatively rotatably borne on the counter shaft 46 with its position in the axial direction fixed and which is meshed with the second reverse idle gear 68. The first and second reverse idle gear 67 and 68 integral with each other are rotatably borne on a reverse idle shaft 70 having both end parts supported on the crankcase 23 while having its axis parallel to the first main shaft 44, the second main shaft 45 and the counter shaft 46.

A ring-shaped engaged member 71 is firmly attached to an end part, on the 3rd-speed drive idle gear 59 side, of the 1st-speed drive idle gear 57. A first shifter 72 is relatively non-rotatably and axially slidably borne on the first main shaft 44 between the engaged member 71 and the 3rd-speed drive idle gear 59. The 5th-speed drive gear 61 is provided as one body with the first shifter 72. The first shifter 72 is slidable in the axial direction of the first main shaft 44 so as to be selectively situated in a position where it is engaged with the engaged member 71 to establish the 1st-speed gear train G1, a position where it is engaged with the 3rd-speed drive idle gear 59 to establish the 3rd-speed gear train G3, and an intermediate position (neutral condition) where it is not engaged with either of the 1st-speed and 3rd-speed drive idle gears 57 and 59.

In addition, the 3rd-speed driven gear 60 in the 3rd-speed gear train G3 is provided as one body with a second shifter 73 relatively non-rotatably and axially slidably borne on the counter shaft 46 between the 5th-speed driven idle gear 62 and the reverse driven idle gear 69. The second shifter 73 is slidable in the axial direction of the counter shaft 46, between a position where it is engaged with the 5th-speed driven idle gear 62 while maintaining the meshing between the 3rd-speed driven idle gear 59 and the 3rd-speed driven gear 60 and a position where it is engaged with the reverse idle gear 69. When the second shifter 73 is engaged with the 5th-speed driven idle gear 62 under the condition where the first shifter 72 is in the intermediate position, the 5th-speed gear train G5 is established.

Furthermore, a third shifter 74 is relatively non-rotatably and axially slidably borne on the counter shaft 46 between the 2nd-speed driven idle gear 64 and the 4th-speed driven idle gear 66. The third shifter 74 is slidable in the axial direction of the counter shaft 46 so as to be selectively situated in a position where it is engaged with the 2nd-speed driven idle gear 64 to establish the 2nd-speed gear train G2, a position where it is engaged with the 4th-speed driven idle gear 66 to establish the 4th-speed gear train G4, and an intermediate position (neutral condition) where it is not engaged with either of the 2nd-speed and 4th-speed driven idle gears 64 and 66. When the second shifter 73 is engaged with the reverse driven idle gear 69 under the condition where the first and second shifters 72 and 74 are in their intermediate positions, the reverse gear train GR is established.

On the side of the engaged member 71 firmly attached to the 1st-speed drive idle gear 57, an end part of the first shifter 72 is provided with a plurality of first engaging projections 78 at regular intervals along the circumferential direction, as shown in FIG. 4. The engaged member 71 is provided with a plurality of first lock projections 79 capable of respective engagement with the first engaging projections 78. An end part, on the 3rd-speed drive idle gear 59 side, of the first shifter 72 is provided with a plurality of second engaging projections 80 at regular intervals along the circumferential direction, as shown in FIG. 5. The 3rd-speed drive idle gear 59 is provided with a plurality of second lock projections 81 capable of respective engagement with the second engaging projections 80.

An end part, on the 5th-speed driven idle gear 62 side, of the second shifter 73 is provided with a plurality of third engaging projections 82 at regular intervals along the circumferential direction, as shown in FIG. 6. The 5th-speed driven idle gear 62 is provided with a plurality of third lock projections 83 capable of respective engagement with the third engaging projections 82. In addition, an end part, on the reverse driven idle gear 69 side, of the second shifter 73 is provided with a plurality of fourth engaging projections 84 at regular intervals along the circumferential direction, as shown in FIG. 7. The reverse driven idle gear 69 is provided with a plurality of fourth lock projections 85 capable of respective engagement with the fourth engaging projections 84.

An end part, on the 2nd-speed driven idle gear 64 side, of the third shifter 74 is provided with a plurality of fifth engaging projections 86 at regular intervals along the circumferential direction, as shown in FIG. 8. The second driven idle gear 64 is provided with a plurality of fifth lock projections 87 capable of respective engagement with the fifth engaging projections 86. Besides, an end part, on the 4th-speed driven idle gear 66 side, of the third shifter 74 is provided with a plurality of sixth engaging projections 88 at regular intervals along the circumferential direction, as shown in FIG. 9. The 4th-speed driven idle gear 66 is provided with a plurality of sixth lock projections 89 that are capable of respective engagement with the sixth engaging projections 88.

Moreover, the numbers of the first to sixth engaging projections 78, 80, 82, 84, 86, 88 and the first to sixth lock projections 79, 81, 83, 85, 87, 89, which are formed as small as possible, are set as large as possible. Each of the first to sixth engaging projections 78, 80, 82, 84, 86, 88 and the first to sixth lock projections 79, 81, 83, 85, 87, 89 is formed to be similar in shape to a tooth of a gear, with its width being reduced as its tip is approached. By setting the size, number and shape of the first to sixth engaging projections 78, 80, 82, 84, 86, 88 and the first to sixth lock projections 79, 81, 83, 85, 87, 89 in this manner, it is possible to reduce the engaging sound generated when the first to sixth engaging projections 78, 80, 82, 84, 86, 88 come into engagement with the corresponding ones of the first to sixth lock projections 79, 81, 83, 85, 87, 89.

Referring to FIG. 10 also, the first to third shifters 72, 73 and 74 are rotatably held by first to third shift forks 91, 92 and 93. The shift forks 91 to 93 are borne on a shift fork shaft 94 supported on the crankcase 23 while having its axis parallel to the first and second main shafts 44, 45 and the counter shaft 46, so as to be slidable in the axial direction of the shift fork shaft 94. In addition, a shift drum 95 having an axis parallel to the first and second main shafts 44, 45 and the counter shaft 46 is borne on the crankcase 23 so as to be turnable about the axis. Pins 91a, 92a and 93a projecting from the first to third shift forks 91 to 93 are engaged respectively with first to third lead grooves 96, 97 and 98 provided in the outer peripheral surface of the shift drum 95. With the shift drum 95 turned, the first to third shift forks 91 to 93 are slid in the axial direction according to the patterns of the first to third lead grooves 96 to 98.

In FIG. 11, the first lead groove 96 is for guiding the sliding operations of the first shift fork 91 holding the first shifter 72. The first lead groove 96 has: a 1st-speed gear train establishing part 96a extending along the circumferential direction of the shift drum 95 so as to engage the first shifter 72 with the engaged member 71 firmly attached to the 1st-speed drive idle gear 57; a 3rd-speed gear train establishing part 96b extending along the circumferential direction of the shift drum 95, at a position set off in the axial direction of the shift drum 95 from the 1st-speed gear train establishing part 96a, so as to engage the first shifter 72 with the 3rd-speed drive idle gear 59; a connecting part 96c for connection between the 1st-speed and 3rd-speed gear train establishing parts 96a and 96b; and a pair of intermediate position parts 96d and 96e for holding the shifter 72 at intermediate positions. At a central portion of the connecting part 96c, a neutral part 96f for holding the first shifter 72 at a position for disengagement from the 1st-speed and 3rd-speed drive idle gears 57 and 59 is formed to extend slightly along the circumferential direction of the shift drum 95.

In addition, the second lead groove 97 is for guiding the sliding operations of the second shift fork 92 holding the second shifter 73. The second lead groove 97 has: a reverse gear train establishing part 97a extending along the circumferential direction of the shift drum 95 so as to engage the second shifter 73 with the reverse driven idle gear 69; a 5th-speed gear train establishing part 97b extending along the circumferential direction of the shift drum 95, at a position set off in the axial direction of the shift drum 95 from the reverse gear train establishing part 97a, so as to engage the second shifter 73 with the 5th-speed driven idle gear 62; and an intermediate position part 97c for holding the second shifter 73 at an intermediate position.

Furthermore, the third lead groove 98 is for guiding the sliding operations of the third shift fork 93 holding the third shifter 74. The third lead groove 98 has: a 2nd-speed gear train establishing part 98a extending along the circumferential direction of the shift drum 95 so as to engage the third shifter 74 with the 2nd-speed driven idle gear 64; a 4th-speed gear train establishing part 98b extending along the circumferential direction of the shift drum 95, at a position set off in the axial direction of the shift drum 95 from the 2nd-speed gear train establishing part 98a, so as to engage the third shifter 74 with the 4th-speed driven idle gear 66; a connecting part 98c for connection between the 2nd-speed and 4th-speed gear train establishing parts 98a and 98b; and an intermediate position part 98d for holding the third shifter 74 at an intermediate position. At a central portion of the connecting part 98c, a neutral part 98e for holding the third shifter 74 at a position for disengagement from the 2nd-speed and 4th-speed driven idle gears 64 and 66 is formed to extend slightly along the circumferential direction of the shift drum 95.

Meanwhile, the shift drum 95 has a reverse position $P_R$, a neutral position $P_N$, a 1st-speed and 2nd-speed position $P_{1-2}$, a 2nd-speed and 3rd-speed position $P_{2-3}$, a 3rd-speed and 4th-speed position $P_{3-4}$, and a 4th-speed and 5th-speed position $P_{4-5}$ which are sequentially set at an angular interval of 60 degrees.

In the reverse position $P_R$, the pins 91a and 93a of the first and third shift forks 91 and 93 are engaged with the intermediate position parts 96d and 98d of the first and third lead grooves 96 and 98. The pin 92a of the second shift fork 92 is engaged with the reverse gear train establishing part 97a of the second lead groove 97, to establish the reverse gear train GR. In the neutral position $P_N$, the pins 91a to 93a of the first to third shift forks 91 to 93 are engaged with the intermediate position parts 96d, 97c and 98d of the first to third lead grooves 96 to 98, to put all the gear trains G1 to G5 and GR in the non-established conditions. In the 1st-speed and 2nd-speed position $P_{1-2}$, the pin 91a of the first shift fork 91 is engaged with the 1st-speed gear train establishing part 96a of the first lead groove 96, the pin 92a of the second shift fork 92 is engaged with the intermediate position part 97c of the second lead groove 97, and the pin 93a of the third shift fork 93 is engaged with the 2nd-speed gear train establishing part 98a of the third lead groove 98, to establish both the 1st-speed and 2nd-speed gear trains G1 and G2. In the 2nd-speed and 3rd-speed position $P_{2-3}$, the pin 91a of the first shift fork 91 is engaged with the 3rd-speed gear train establishing part 96b of the first lead groove 96, the pin 92a of the second shift fork 92 is engaged with the intermediate position part 97c of the second lead groove 97, and the pin 93a of the third shift fork 93 is engaged with the 2nd-speed gear train establishing part 98a of the third lead groove 98, to establish both the 2nd-speed and 3rd-speed gear trains G2 and G3. In the 3rd-speed and 4th-speed position $P_{3-4}$, the pin 91a of the first shift fork 91 is engaged with the 3rd-speed gear train establishing part 96b of the first lead groove 96, the pin 92a of the second shift fork 92 is engaged with the intermediate position part 97c of the second lead groove 97, and the pin 93a of the third shift fork 93 is engaged with the 4th-speed gear train establishing part 98b of the third lead groove 98, to establish both the 3rd-speed and 4th-speed gear trains G3 and G4. Further, in the 4th-speed and 5th-speed position $P_{4-5}$, the pin 91a of the first shift fork 91 is engaged with the intermediate position part 96e of the first lead groove 96, the pin 92a of the second shift fork 92 is engaged with the 5th-speed gear train establishing part 97b of the second lead groove 97, and the pin 93a of the third shift fork 93 is engaged with the 4th-speed gear train establishing part 98b of the third lead groove 98, to establish both the 4th-speed and 5th-speed gear trains G4 and G5.

Thus, at the time of shift-up, the gear train on the higher speed stage side can be preliminarily established prior to the changeover to the higher speed stage, and, at the time of shift-down, the gear train on the lower speed stage side can be preliminarily established prior to the changeover to the lower speed stage.

Meanwhile, at a central portion between the 1st-speed and 2nd-speed position $P_{1-2}$ and the 2nd-speed and 3rd-speed position $P_{2-3}$ in the circumferential direction of the shift drum 95, a 1-3 neutral position $NP_1$ as a neutral position at the times of changing over the establishment conditions of the 1st-speed gear train G1 and the 3rd-speed gear train G3 which are provided between the first main shaft 44 and the counter shaft 46 is set. The neutral part 96f of the first lead groove 96 is disposed at the 1-3 neutral position $NP_1$. In addition, at a central portion between the 2nd-speed and 3rd-speed position $P_{2-3}$ and the 3rd-speed and 4th-speed position $P_{3-4}$ in the circumferential direction of the shift drum 95, a 2-4 neutral position $NP_2$ as a neutral position at the times of changing over the establishment conditions of the 2nd-speed gear train G2 and the 4th-speed gear train G4 which are provided between the second main shaft 45 and the counter shaft 46 is set. The neutral part 98e of the third lead groove 98 is disposed at the 2-4 neutral position $NP_2$. Further, at a central portion between the 3rd-speed and 4th-speed position $P_{3-4}$ and the 4th-speed and 5th-speed position $P_{4-5}$ in the circumferential direction of the shift drum 95, a 3-5 neutral position $NP_3$ as a neutral position at the times of changing over the establishment conditions of the 3rd-speed gear train G3 and the 5th-speed gear train G5 which are provided between the first main shaft 44 and the counter shaft 46 is set.

Referring to FIGS. 12 and 13 also, a shift drum center 99 turned together with the shift drum 95 is fixed to one end of the shift drum 95 by a bolt 111 coaxial therewith. The shift drum center 99 is provided at its outer periphery with a reverse positioning notch $S_R$, a neutral positioning notch $S_N$, a 1st-speed and 2nd-speed positioning notch $S_{1-2}$, a 2nd-speed and 3rd-speed positioning notch $S_{2-3}$, a 3rd-speed and 4th-speed positioning notch $S_{3-4}$, and a 4th-speed and 5th-speed positioning notch $S_{4-5}$ at regular intervals and corresponding individually to the reverse position $P_R$, the neutral position $P_N$, the 1st-speed and 2nd-speed position $P_{1-2}$, the 2nd-speed and 3rd-speed position $P_{2-3}$, the 3rd-speed and 4th-speed position $P_{3-4}$, and the 4th-speed and 5th-speed position $P_{4-5}$ set on the shift drum 95 for the purpose of selectively establishing the 1st-speed to 5th-speed gear trains G1 to G5 and the reverse gear train GR. In this embodiment, the notches $S_R$, $S_N$, $S_{1-2}$, $S_{2-3}$, $S_{3-4}$ and $S_{4-5}$ are provided at the outer periphery of the shift drum center 99 at an angular interval of 60 degrees.

Moreover, at central portions between the adjacent ones of the 1st-speed and 2nd-speed positioning notch $S_{1-2}$, the 2nd-speed and 3rd-speed positioning notch $S_{2-3}$, the 3rd-speed and 4th-speed positioning notch $S_{3-4}$ and the 4th-speed and 5th-speed positioning notch $S_{4-5}$, the outer periphery of the shift drum center 99 is provided with neutral notches $N_1$, $N_2$ and $N_3$ which correspond individually to the 1-3 neutral position $NP_1$, the 2-4 neutral position $NP_2$ and the 3-5 neutral position $NP_3$.

The notches $S_R$, $S_N$, $S_{1-2}$, $S_{2-3}$, $S_{3-4}$, $S_{4-5}$, $N_1$, $N_2$ and $N_3$ provided in the shift drum center 99 are notches with which to selectively engage a drum stopper arm 100. The drum stopper arm 100 is composed of an arm 101 having a base end part turnably supported on the case half 23a of the crankcase 23 through a support shaft 103 having an axis parallel to the axis of the shift drum 95 and the shift drum center 99, and a roller 102 rotatably supported on the tip of the arm 101 so as to be engaged with one of the notches $S_R$, $S_N$, $S_{1-2}$, $S_{2-3}$, $S_{3-4}$, $S_{4-5}$, $N_1$, $N_2$ and $N_3$. Moreover, each of the notches $S_R$, $S_N$, $S_{1-2}$, $S_{2-3}$, $S_{3-4}$, $S_{4-5}$, $N_1$, $N_2$ and $N_3$ is concaved in an arcuate shape for stabilization of the engaged state of the roller 102.

A torsion spring 104 is provided between the base end part of the arm 101 and the case half 23a. The arm 101, or the drum stopper arm 100, is energized by a spring force of the torsion spring 104 toward the center of turning of the shift drum center 99 so as to engage the roller 102 with one of the notches $S_R$, $S_N$, $S_{1-2}$, $S_{2-3}$, $S_{3-4}$, $S_{4-5}$, $N_1$, $N_2$ and $N_3$.

The shift drum center 99 is intermittently turningly driven by a feed mechanism 105 by a predetermined angle (in this embodiment, 60 degrees). The feed mechanism 105 includes: a drum shifter 106 having at least a part disposed in the shift drum center 99 so as to be capable of turning about an axis coaxial with the shift drum center 99; a pair of pawls 107, 107 symmetrically mounted to the drum shifter 106 so as to be tilted up and down in radial directions of the drum shifter 106; a pair of springs 108, 108 for energizing the pawls 107 in the tilting-up directions; engaging recesses 109, 109 provided at regular intervals along the circumferential direction of the inner periphery of the shift drum center 99 so as to be capable of engagement with both the pawls 107; a fixed guide frame 110 for guiding the tilted conditions of both the pawls 107 according to the turning of the drum shifter 106; and a shifting operating motor 120 for imparting a turning force to the drum shifter 106.

The drum shifter 106 is borne so as to be capable of turning about an axis coaxial with the shift drum center 99, by a shaft part 111a coaxially possessed by the bolt 111 for coaxially connecting the shift drum center 99 to one end of the shift drum 95. Most part of the drum shifter 106, which has a part protruding outward from the shift drum center 99, is relatively turnably disposed in the shift drum center 99.

In addition, the springs 108 are disposed, in a contracted state, between closed ends of containing recesses 112, 112 provided in an outer peripheral part of the drum shifter 106 and bottomed tubular lifters 113, 113 slidably fitted in the containing recesses 112 so as to make contact with tip parts of the pawls 107. The pawls 107 are energized in their tilting-up directions by the springs 108. When the pawls 107 are tilted up, their tip parts protrude from the outer periphery of the drum shifter 106; on the other hand, when the pawls 107 are tilted down, their tip parts are located roughly at the same positions as the outer periphery of the drum shifter 106.

The inner periphery of the shift drum center 99 is provided with a plurality of (in this embodiment, six) engaging recesses 109, 109 at regular intervals along the circumferential direction. In the condition where the drum stopper arm 100 is engaged with one of the reverse positioning notch $S_R$, the neutral positioning notch $S_N$, the 1st-speed and 2nd-speed positioning notch $S_{1-2}$, the 2nd-speed and 3rd-speed positioning notch $S_{2-3}$, the 3rd-speed and 4th-speed positioning notch $S_{3-4}$ and the 3rd-speed and 4th-speed positioning notch $S_{4-5}$, the tip parts of both the pawls 107 can be selectively engaged with two engaging recesses 109, 109 so located that two engaging recesses 109, 109 (on each side) are interposed therebetween.

The guide plate 110 is fastened to the case half 23a of the crankcase 23 by a pair of bolts 116, 116, at such a position that the shift drum center 99 is located between the guide plate 110 and the case half 23a. The guide plate 110 is provided with a guide hole 117 corresponding to the drum shifter 106.

The guide hole 117 is composed of: a large-diameter arcuate part 117a formed to be greater in diameter than the outer periphery of the drum shifter 106, with the axis of turning of the shift drum center 99 and the drum shifter 106, or the axis of the shaft part 111a, as a center; a restricting projected part 117b projected from a central portion of the large-diameter arcuate part 117a to the inner side relative to the outer periphery of the drum shift 106; a small-diameter arcuate part 117c formed to be smaller in diameter than the outer periphery of the drum shifter 106, with the axis of the shaft part 111a as a center; and connecting parts 117d, 117d connecting both ends of the large-diameter arcuate parts 117a to both ends of the small-diameter arcuate parts 117c. The length in the circumferential direction of the large-diameter arcuate part 117a is set to correspond to the length between the two engaging recesses 109 with which the tip parts of both the pawls 107 are engaged.

Moreover, the connecting parts 117d are provided at intermediate portions thereof with stepped parts 117e for ensuring that when the ratchets (pawls) 107 in engagement with the engaging recesses 109 are moved to the small-diameter arcuate part 117c side according to the turning of the drum shifter 106, the stepped parts 117e make contact with the pawls 107 and press the pawls 107 to the tilting-down sides. The stepped parts 117e are located on the outer side than the inner periphery of the shift drum center 99.

In addition, the restricting projected part 117b is so formed as to restrict the turning of the drum shifter 106 by abutting against a tip part of one of both of the pawls 107 as the drum shifter 106 operates one time so as to once stop in its course according to the shifting operating motor 120, which once stops in the course of its operation.

Paying attention to FIG. 10, a cover 119 for forming a speed reduction mechanism containing chamber 118 between itself and the first crankcase cover 31 is fastened to the first crankcase cover 31, and the shifting operating motor 120 is attached to the cover 119. The shifting operating motor 120 has a rotational axis parallel to the shift drum 95, and is attached to the cover 119 so that its output shaft 120a projects into the speed reduction mechanism containing chamber 118. On the other hand, a change shaft 121 having an axis parallel to the shift drum 95 is so disposed as to rotatably penetrate the first crankcase cover 31, the cover 119 and the second crankcase cover 32, and a gear speed reduction mechanism 122 provided between the output shaft 120a and the change shaft 121 is contained in the speed reduction mechanism containing chamber 118.

The speed reduction gear mechanism 122 is composed of a drive gear 123 provided as one body with the output shaft 120a of the shifting operating motor 120 in the speed reduction mechanism containing chamber 118. A first intermediate gear 124 is meshed with the drive gear 123. A second intermediate gear 125 is rotated as one body with the first intermediate gear 124. A driven sector gear 126 is fixed to one end side of the change shaft 121 in the speed reduction mechanism containing chamber 118 and is meshed with the second intermediate gear 125. Rotating power of the shifting operating motor 120 is transmitted to the change shaft 121 through speed reduction by the speed reduction gear mechanism 122.

A change arm 127 having a base end part fixed to the change shaft 121 and extending along a radial direction of the change shaft 121 toward the drum shifter 106 side is fixed to the change shaft 121. An engaging pin 129 rooted in the drum shifter 106 at a position set off from the rotational axis of the drum shifter 106 is engaged with a slot-formed engaging hole 128 provided in the change arm 127 in the state of extending in a radial direction of the change shaft 121.

Besides, an arm 130 extending in a radial direction of the change shaft 121 so as to form a roughly L shape with the change arm 127 is provided continuous to or integral with the base end part of the change arm 127. A tip part of the arm 130 is provided with a slot 131 in an arcuate shape with the axis of the change shaft 121 as a center. A projection 132 is located on a straight line connecting the center in the circumferential direction of the slot 131 and the axis of the change shaft 121 to each other.

On the other hand, a pin 133 passed through the slot 131 is rooted in the case half 23a of the crankcase 23. A clip spring 134 provided at both ends thereof with a pair of clamp arms 134a, 134a for clamping the projection 132 and the pin 133 from both sides is disposed between the change arm 127 and the arm 130 and the case half 23a of the crankcase 23 in the manner of surrounding the change shaft 121. This ensures that the change arm 127 and the arm 130 are energized to middle positions such that the projection 132 and the pin 133 are aligned on the straight line connecting the center in the circumferential direction of the slot 131 and the axis of the change shaft 121 to each other.

Here, description will be made of the case of shifting up to the 2nd-speed stage in a 1st-speed running condition, i.e., in the condition where the drum stopper arm 100 is engaged with the 1st-speed and 2nd-speed positioning notch $S_{1-2}$ in the shift drum center 99 and where the first hydraulic clutch 52 is connected whereas the second hydraulic clutch 53 is disconnected. As the shifting electric motor 120 operates, the change shaft 121 and the change arm 127 are turned clockwise in FIG. 12. Since the engaging pin 129 is in engagement with the slot 128 in the change arm 127, the drum shifter 106 of the feed mechanism 105 is turned clockwise in FIG. 12 while displacing the engaging pin 129 inside the engaging hole 128 toward the change shaft 121.

As a result, one of the pawls 107, 107 in respective engagement with the two engaging recesses 109, 109 turns at a part corresponding to the large-diameter arcuate part 117a of the guide hole 117 in the guide plate 110 about the axis of the shaft part 110a, whereby the shift drum center 99 is pressed to turn clockwise in FIG. 12.

At the time when the shift drum 95 is driven to turn in this manner, the shift drum 95 may in some cases be turned in advance. In such a case, as shown in FIG. 14, in the non-established conditions of the gear trains G1 to G5 and GR, the other of the pawls 107, 107 (the pawl not pressing the shift drum center 99) abuts on the stepped part 117e at an intermediate portion of the connecting part 117d of the guide hole 117; this brings the pawl 107 on the other side into contact and engagement with the engaging recess 109, whereby the preceding turning of the shift drum 95 is stopped.

In this condition, as shown in FIG. 15, the roller 102 of the drum stopper arm 100 rides across the crest portion between the 1st-speed and 2nd-speed positioning notch $S_{1-2}$ and the neutral notch $N_1$ to be engaged with the neutral notch $N_1$, whereby the neutral position of the shift drum 95 can be obtained accurately. With the drum shifter 106 turned further, the pawl 107 on the other side is turned in the manner of being folded to the inside by the stepped part 117e, and the roller 102 of the drum stopper arm 100 rides across the crest portion between the neutral notch $N_1$ and the 2nd-speed and 3rd-speed positioning notch $S_{2-3}$.

With the drum shifter 106 turned further, the pawl 107 on the other side has its tip part put into sliding contact with the small-diameter arcuate part 117c of the guide hole 117 in the guide plate 110. When the drum shifter 106 is turned until riding across the crest part adjacent to the 2nd-speed and 3rd-speed positioning notch $S_{2-3}$, the operation of the shifting electric motor 120 is stopped. As a result, the shift drum center 99 is turned until the roller 102 of the drum stopper arm 100 is brought into engagement with the 2nd-speed and 3rd-speed positioning notch $S_{2-3}$, as shown in FIG. 16. In other words, it suffices for the shifting electric motor 120 to exhibit power for turning the drum shifter 106 by an angle less than 60 degrees which is the angular interval between the 1st-speed and 2nd-speed positioning notch $S_{1-2}$ and the 2nd-speed and 3rd-speed positioning notch $S_{2-3}$, for example, by an angle of 53.7 degrees.

In this manner, the feed mechanism 105 once slowly lowers the turning speed of the shift drum 95 in the course of shift-up from the 1st-speed to the 2nd-speed. Such an action of the feed mechanism 105 is effected also at the times of shift-up from the 2nd-speed to the 3rd-speed, shift-up from the 3rd-speed to the 4th-speed, shift-up from the 4th-speed to the 5th-speed, shift-down from the 5th-speed to the 4th-speed, shift-down from the 4th-speed to the 3rd-speed, shift-down from the 3rd-speed to the 2nd-speed, and shift-down from the 2nd-speed to the 1st-speed.

In addition, after the turning of the shift drum 95 is stopped, with the roller 102 of the drum stopper arm 100 engaged with one of the reverse positioning notch $S_R$, the neutral positioning notch $S_N$, the 1st-speed and 2nd-speed positioning notch $S_{1-2}$, the 2nd-speed and 3rd-speed positioning notch $S_{2-3}$, the 3rd-speed and 4th-speed positioning notch $S_{3-4}$ and the 4th-speed and 5th-speed positioning notch $S_{4-5}$, the change arm 127 is returned to the position shown in FIGS. 12 and 13 by the spring force of the clip spring 134, and the drum shifter 106 also is returned to the position shown in FIGS. 12 and 13.

The turning angle of the shift drum 95 is detected by a drum turning angle detector 135. The drum turning angle detector 135 is connected to the other end of the shift drum 95 and attached to the second crankcase cover 32. In addition, the turning angle of the change shaft 121 is detected by a change shaft turning angle detector 136. The change shaft turning angle detector 136 is connected to the other end of the change shaft 121 and attached to the second crankcase cover 32.

The operation of the shifting operating motor 120 is controlled following the procedure shown in FIG. 17. In step S1, it is determined whether or not the operation of the shifting operating motor 120 is to be started, and the turning angle of the change shaft 121 is initialized to "0". In the next step S2, it is determined whether or not the power source voltage, or the output voltage of a battery, is in a normal state in excess of a predetermined value. When the power source voltage is determined to be deficient, step S3 is entered, where the operation of the shifting operating motor 120 is stopped. On the other hand, when the power source voltage is determined to be normal, the control process goes from step S2 to step S4, where it is determined whether or not the operation to be made is a shift-up. When the operation to be made is a shift-up, step S5 is entered, where a processing in a shift-up mode is executed. When the operation to be made is not a shift-up, step S6 is entered, where a processing in a shift-down mode is executed.

In the shift-up mode, the processing shown in FIG. 18 is carried out, whereby the turning angle of the change shaft 121 is varied as shown in FIG. 19. Specifically, in step S11, the shifting operating motor 120 is so operated as to turn the change shaft 121 so that the turning angle of the change shaft 121 detected by the change shaft turning angle detector 136 becomes α1. The processing in step S11 is for examining the turning direction of the change shaft 121 and the required time. When it is examined that the turning angle α1 is attained at time t1, step S12 is entered, where the shifting operating motor 120 is so operated as to turn the chain shaft 121 so that the turning angle of the change shaft 121 detected by the change shaft turning angle detector 136 becomes α2. The turning angle α2 is set to about one half of the turning angle (in this embodiment, 60 degrees) necessary for turning the shift drum 95 sequentially to each of the reverse position $P_R$, the neutral position $P_N$, the 1st-speed and 2nd-speed position $P_{1-2}$, the 2nd-speed and 3rd-speed position $P_{2-3}$, the 3rd-speed and 4th-speed position $P_{3-4}$ and the 4th-speed and 5th-speed position $P_{4-5}$; namely, the turning angle α2 is about 30 degrees in this embodiment. By the operation of the shifter by the turning of the change shaft 121 up to the turning angle α2, the gear train having been established is put into a non-established condition; hence, a neutral condition is obtained.

At time t2 when the turning angle of the change shaft 121 has just reached α2, step S13 is entered, where the operation of the shifting operating motor 120 is once stopped, and the stopped condition is maintained for a predetermined time ΔT until time t3.

At time t3, step S14 is entered, where the shifting operating motor 120 is rotated in the same direction as above so as to turn the change shaft 121 in the same direction as those for obtaining the turning angles α1 and α2, until a turning angle α3 is reached. The turning angle α3 is the turning angle necessary for turning the shift drum 95 sequentially to each of the reverse position $P_R$, the neutral position $P_N$, the 1st-speed and 2nd-speed position $P_{1-2}$, the 2nd-speed and 3rd-speed position $P_{2-3}$, the 3rd-speed and 4th-speed position $P_{3-4}$ and the 4th-speed and 5th-speed position $P_{4-5}$, and is 60 degrees in this embodiment. With the change shaft 121 turned to the turning angle α3, the gear train to be established is put into the established condition. In this case, the turning of the drum shifter 106 is restricted by the abutment of the tip part of one of both the pawls 107 against the restricting projected part 117b.

At time t4 when the change shaft 121 has just been turned to the turning angle α3, step S15 is entered, where it is checked by the drum turning angle detector 135 whether or not the shift drum 95 is in a predetermined turning position. At time t5, step S16 is entered, where the change shaft 121 is slowly turned in the reverse direction. This processing is for preventing the selective engagement of the drum stopper arm 100 with the notches $S_{2-3}$, $S_{3-4}$ and $S_{4-5}$ of the shift drum center 99 from being canceled. At time t6, step S17 is entered, where the shifting operating motor 120 is so operated as to turn the change shaft 121 at a normal speed in the reverse direction until it is returned to the angle of "0" degrees.

Here, description will be made of the case of engaging the drum stopper arm 100 with the 2nd-speed and 3rd-speed positioning notch $S_{2-3}$ of the shift drum center 99 by preliminary speed change, in shifting up to the 3rd-speed in the 2nd-speed operating condition, i.e., in the condition where the drum stopper arm 100 is engaged with the 1st-speed and 2nd-speed positioning notch $S_{1-2}$ and where the second hydraulic clutch 53 is connected whereas the first hydraulic clutch 52 is disconnected. According as the shifting operating motor 120 operates, the change shaft 121 and the change arm 127 are turned clockwise in FIG. 12, and, since the engaging pin 129 is engaged with the slot 128 in the change arm 127, the drum shifter 106 of the feed mechanism 105 is turned clockwise in FIG. 12 while displacing the engaging pin 129 in the engaging hole 128 toward the change shaft 121.

As a result, one of the pawls 107, 107 in respective engagement with the two engaging recesses 109, 109 turns at a part corresponding to the large-diameter arcuate part 117a of the guide hole 117 in the guide plate 110 around the axis of the shaft part 110a, whereby the shift drum center 99 is turned clockwise in FIG. 12. With the shift drum center 99, or the shift drum 95, turned about 30 degrees, the roller 102 of the drum stopper arm 100 rides across the crest between the 1st-speed and 2nd-speed positioning notch $S_{1-2}$ and the neutral notch $N_1$ to be engaged with the neutral notch $N_1$, as shown in FIG. 15. In this condition, the operation of the shifting operating motor 120 is once stopped, and the stopped condition is maintained for a predetermined time ΔT.

After the lapse of the predetermined time ΔT, the operation of the shifting operating motor 120 is again started, and the drum shifter 106 is turned until the roller 102 of the drum stopper arm 100 is engaged with the 2nd-speed and 3rd-speed positioning notch $S_{2-3}$. With the first hydraulic clutch 52 connected in this condition, the shift-up to the 3rd-speed is completed. When the operation of the shifting operating motor 120 is stopped, the change arm 127 is returned to the position shown in FIGS. 12 and 13 by the spring force of the clip spring 134, and the drum shifter 106 also is returned to the position shown in FIGS. 12 and 13.

Specifically, in turning the shift drum center 99 until engaging the drum stopper arm 100 with the 2nd-speed and 3rd-speed positioning notch $S_{2-3}$ starting from the condition where the drum stopper arm 100 is engaged in the 1st-speed and 2nd-speed positioning notch $S_{1-2}$, the feed mechanism 105 having the shifting operating motor 120 momentarily maintains the condition where the drum stopper arm 100 is engaged in the neutral notch $N_1$ by once stopping in the course of the turning, whereby the neutral condition of the first shifter 72 is momentarily maintained.

In this manner, in engaging the drum stopper arm 100 with the 2nd-speed and 3rd-speed positioning notch $S_{2-3}$ of the shift drum center 99 by a preliminary speed change which is a shift-up from the 1st-speed to the 3rd-speed during the 2nd-speed running, the feed mechanism 105 once stops the turning speed of the shift drum 95 of the shifting operating motor 120. Such an action of the feed mechanism 105 is effected also at the times of a preliminary speed change which is a shift-up from the 3rd-speed to the 5th-speed and a preliminary speed change which is a shift-up from the 2nd-speed to the 4th-speed.

At the times of a preliminary speed change which is a shift-down from the 4th-speed to the 2nd-speed, a preliminary speed change which is a shift-down from the 5th-speed to the 3rd-speed and a preliminary speed change which is a shift-down from the 3rd-speed to the 1st-speed, a shift-down mode in step S6 in FIG. 17 is carried out. In this shift-down mode, a processing similar to that at the time of the shift-up is conducted by reversing the rotating direction of the shifting operating motor 120 as compared with that in the shift-up mode.

Now, the operations of the first embodiment will be described below. In the case where the first and third shifters 72 and 74 rotated together with the first main shaft 44 and the counter shaft 46 are to be slid to the sides such as to disengage them from one-side ones of the 1st-speed drive idle gear 57 and the 3rd-speed drive idle gear 59 and the 2nd-speed driven idle gear 64 and the 4th-speed driven idle gear 66 located respectively on both sides of the first and third shifters 72 and 74 and to engage them with the other-side ones of the idle gears, the first and third shift forks 91 to 93 are guided by the neutral parts 96f, 98e which are formed at central portions of the connecting parts 96c, 98c possessed by the first and third lead grooves 96, 98 provided in the outer periphery of the shift drum 95 and which extend in the circumferential direction of the shift drum 95. Therefore, in relation to the turning of the shift drum 95, the timing of engagement of the first and third shifters 72, 74 with the other-side ones of the 1st-speed drive idle gear 57 and the 3rd-speed drive idle gear 59 and the 2nd-speed driven idle gear 64 and the 4th-speed driven idle gear 66 can be retarded, as compared with that in the system wherein the connecting parts are rectilinear.

Moreover, in sliding the first to third shifters 72 to 74 so as to change over the establishment conditions of the gear trains G1 to G5 and GR, the feed mechanism 105 decelerates or once stops the turning of the shift drum center 99 in the neutral condition of the shifters 72 to 74 in the course of the sliding of the shifters 72 to 74 by turning the shift drum center 99 by a predetermined angle. In addition, in the course of establishing of the gear train, the turning of the shift drum 95, i.e., the sliding operations of the first to third shifters 72 to 74 are once stopped, and the first to third shifters 72 to 74 are put into the neutral condition. Further, the shift drum center 99 is provided in its outer periphery with the plurality of positioning notches $S_{1-2}$, $S_{2-3}$, $S_{3-4}$, $S_{4-5}$ at regular intervals so as to establish a selected one of the gear trains G1 to G5 by selective engagement therewith of the drum stopper arm 100, and with the neutral notches $N_1$, $N_2$, $N_3$ disposed at central portions between the positioning notches $S_{1-2}$, $S_{2-3}$, $S_{3-4}$, $S_{4-5}$ capable of engagement with the drum stopper arm 100. Therefore, in the course of establishing of the gear train, the turning resistance exerted on the drum shifter 106 from the drum stopper arm 100 is once enlarged, whereby the turning speed of the shift drum 95, i.e., the sliding speeds of the first to third shifters 72 to 74 are once slowed down.

Therefore, in cooperation with the functions of the neutral parts 96f, 98e formed at central portions of the connecting parts 96c, 98c possessed by the lead grooves 96 to 98, it is possible to reduce to a comparatively low level the differences in speed between the first and third shifters 72, 74 and the gears with which the shifters 72, 74 are engaged, and to prevent more effectively the engaging sound from becoming large.

In addition, in the case where the first shifter 72 rotated together with the first main shaft 44 is to be slid to the side such as to disengage it from one of the 1st-speed drive idle gear 57 and the 3rd-speed drive idle gear 59 located respectively on both sides of the first shifter 72 and to engage it with the other of the drive idle gears in the condition where the transmission of power from the engine E to the first main shaft 44 is interrupted and where power from the engine E is transmitted to the second main shaft 45, the first shift fork 91 is guided by the neutral part 96f which is formed at a central portion of the connecting part 96c of the first lead groove 96 provided in the outer periphery of the shift drum 95 and which extends in the circumferential direction of the shift drum 95. Therefore, in relation to the turning of the shift drum 95, the timing of engagement of the first shifter 72 with both the idle gears 57, 59 can be retarded. Besides, the turning of the shift drum center 99 is once stopped in the course of the turning, by the momentary stop in the course of the feeding by a predetermined angle through the feed mechanism 105, the momentary stop in the course of turning of the shift drum 95 through engagement of the pawl 107 with the engaging recess 109 by the guide plate 110, and the engagement of the stopper arm 100 with the neutral notch $N_1$ at the outer periphery of the shift drum 99. Therefore, in the condition where both the idle gears 57, 59 are rotated by the establishment of the 2nd-speed gear train G2 provided between the second main shaft 45 and the counter shaft 46, it is possible to reduce to a comparatively low level the relative rotating speed differences between the rotating speed of the first shifter 72 rotated along with an attendant rotation of the main shaft 44 due to the viscosity of a lubricating oil fillingly placed between the needle bearings 48 provided between the first and second main shafts 44, 45 and the rotating speeds of both the idle gears 57, 59, and it is thereby possible to prevent the engaging sound from becoming large.

Furthermore, in the case where the third shifter 74 rotated together with the counter shaft 46 is to be slid to the side such as to disengage it from one of the 2nd-speed driven idle gear 64 and the 4th-speed driven idle gear 66 located respectively on both sides of the third shifter 74 and to engage it with the other of the idle gears in the condition where the transmission of power from the engine E to the second main shaft 45 is interrupted and where power from the engine E is transmitted to the first main shaft 44, the third shift fork 93 is guided by the neutral part 98f which is formed at a central portion of the connecting part 98c of the third lead groove 98 provided in the outer periphery of the shift drum 95 and which extends in the circumferential direction of the shift drum 95. Therefore, in relation to the turning of the shift drum 95, the timing of engagement of the third shifter 74 with both the idle gears 64, 66 can be retarded. In addition, the turning of the shift drum center 99 is once stopped in the course of the turning, by the momentary stop in the course of the feeding by a predetermined angle by the feed mechanism 105, the turning resistance due to the guide plate 110, and the engagement of the drum stopper arm 100 with the neutral notch $N_2$ in the outer periphery of the shift drum center 99. Therefore, in the condition where the counter shaft 46 and the third shifter 74 are rotated by the establishment of the 3rd-speed gear train G3 provided between the first main shaft 44 and the counter shaft 46, it is possible to reduce to a comparatively low level the relative rotating speed differences between the rotating speeds of the third shifter 74 and both idle gears 64, 66 rotated along with an attendant rotation of the second main shaft 45 due to the viscosity of a lubricating oil fillingly placed between the needle bearings 48 provided between the first and second main shafts 44, 45 or due to the viscosity of a lubricating oil present between the second hydraulic clutch 53 and the power transmitting tubular shaft 49, and it is therefore possible to prevent the engaging sound from becoming large.

Figure 20:
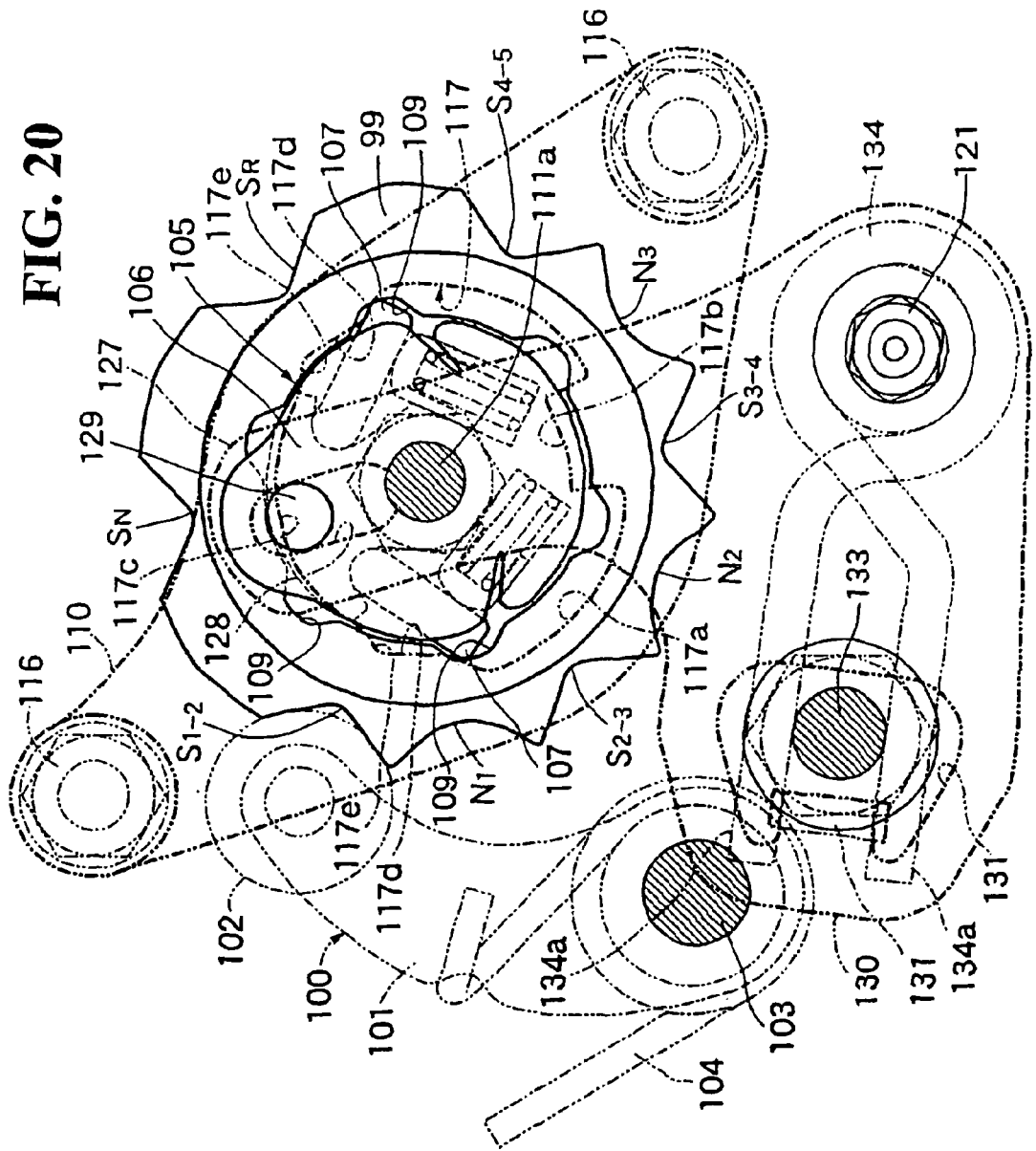
FIG. 20 is a view, corresponding to FIG. 12, of a second embodiment of the present invention.

Now, a second embodiment of the present invention will be described. As shown in FIG. 20, a configuration may be adopted in which, of notches $S_R$, $S_N$, $S_{1-2}$, $S_{2-3}$, $S_{3-4}$, $S_{4-5}$, $N_1$, $N_2$ and $N_3$ provided in a shift drum center 99, each of the reverse positioning notch $S_R$, the neutral positioning notch $S_N$, the 1st-speed and 2nd-speed positioning notch $S_{1-2}$, the 2nd-speed and 3rd-speed positioning notch $S_{2-3}$, the 3rd-speed and 4th-speed positioning notch $S_{3-4}$ and the 4th-speed and 5th-speed positioning notch $S_{4-5}$ is formed to be recessed in a V shape, while each of the neutral notches $N_1$, $N_2$ and $N_3$ is formed to be recessed in an arcuate shape.

According to the second embodiment, the engagement and disengagement of the drum stopper arm 100 with and from each of the positioning notches $S_R$, $S_N$, $S_{1-2}$, $S_{2-3}$, $S_{3-4}$, $S_{4-5}$ can be carried out swiftly. On the other hand, it is made difficult for the drum stopper arm 100 from being released from each of the neutral notches $N_1$, $N_2$, $N_3$, whereby the engaged condition of the drum stopper arm 100 is maintained comparatively long, and the neutral condition can be thereby maintained for a comparatively long time.

While the embodiments of the present invention have been described above, the invention is not limited to the above embodiments, and various design modifications are possible within the scope of the invention as set forth in the claims.

For example, while in the above embodiments a configuration has been adopted in which the first and third shifters 72, 74 are momentarily held in the neutral positions by the neutral parts 96f, 98e of the lead grooves 96, 98 provided in the outer periphery of the shift drum 95 and in which the turning speeds of the shift drum center 99 and the shift drum 95 are lowered by the turning resistance due to the guide plate 110 of the intermittent feed mechanism 105, such mechanism and actions (operations) are not essential to the present invention.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A vehicle transmission comprising:
    main shafts to which power from an engine can be transmitted;
    a counter shaft connected to drive wheels;
    a plurality of change gear stages of gear trains provided between said main shafts and said counter shaft so as to be capable of selective establishment;
    shifters relatively non-rotatably and slidably borne on said main shafts or said counter shaft so as to change over the establishment conditions of said plurality of change gear stages of gear trains;
    a shift drum provided at an outer periphery thereof with lead grooves for engagement with shift forks for rotatably holding said shifters;
    a shift drum center rotated together with said shift drum; and
    an intermittent feed mechanism for intermittently turningly driving said shift drum center,
    wherein said transmission of power from said engine to said main shafts is interrupted when said shifters are slid so as to change over the establishment conditions of said plurality of change gear stages of gear trains, said intermittent feed mechanism including:
        a drum shifter with at least a part thereof disposed in said shift drum center so as to be capable of turning about an axis coaxial with said shift drum center;
        a pair of pawls symmetrically mounted to said drum shifter so as to be tilted up and down in radial directions of said drum shifter;
        a pair of springs for respectively energizing said pawls in tilting-up directions;

a plurality of engaging recesses provided at regular intervals along a circumferential direction at an inner periphery of said shift drum center so that both said pair of pawls can be engaged therewith; and a fixed guide plate for guiding from the radially outer side the tilted conditions of both said pawls according to the turning of said drum shifter, wherein said guide plate is provided with a large-diameter arcuate part larger in diameter than an outer periphery of the drum shifter and a small-diameter arcuate part smaller in diameter than the outer periphery of the drum shifter, and connecting parts connecting said large-diameter arcuate part and said small-diameter arcuate part to each other, and said connecting parts are so formed as to engage said pawls with said engaging recesses in the course of turning of said drum shifter by a turning amount necessary for changing over the establishment conditions of said plurality of change gear stages of gear trains.

2. The vehicle transmission as set forth in claim 1, wherein said connecting parts engage said pawls with said engaging recesses in the condition where said shifters are putting said plurality of change gear stages of gear trains in non-established conditions.

3. The vehicle transmission as set forth in claim 1, wherein when each of the pair of pawls is tilted up, tip parts thereof protrude from an outer periphery of the drum shifter, and when each of the pair of pawls is tilted down, the tip parts are located at the same position as the outer periphery of the drum shifter.

4. The vehicle transmission as set forth in claim 1, wherein the large-diameter arcuate part is with an axis of turning of the shift drum center as a center of the large-diameter arcuate part.

5. The vehicle transmission as set forth in claim 1, wherein the connecting parts are provided at intermediate portions thereof with stepped parts for ensuring that the pair of pawls in engagement with the plurality of engaging recesses are moved to the small-diameter arcuate part side according to the turning of the drum shifter.

6. The vehicle transmission as set forth in claim 1, further comprising a restricting projected part projected from a central portion of the large-diameter arcuate part, said restricting projected part being formed to restrict the turning of the drum shifter by abutting against a tip part of one of the pair of pawls.

7. A vehicle transmission comprising:
first and second main shafts disposed coaxially so that power from an engine can be transmitted thereto;
a counter shaft connected to drive wheels;
a plurality of change gear stages of gear trains provided between said first and second main shafts and said counter shaft so as to be capable of selective establishment;
a shifter relatively non-rotatably and slidably disposed on said first main shaft so as to change over the establishment conditions of a pair of the plurality of change gear stages of gear trains that are provided between said first main shaft and said counter shaft;
a shift drum provided at an outer periphery thereof with a lead groove for engagement with a shift fork for rotatably holding said shifter;
a shift drum center turned together with said shift drum; and
an intermittent feed mechanism for intermittently turningly driving said shift drum center,
wherein the transmission of power from said engine to said first main shaft is interrupted when power from said engine is transmitted to said second main shaft when said shifter is slid so as to change over the establishment conditions of said pair of said plurality of change gear stages of gear trains between said first main shaft and said counter shaft, said intermittent feed mechanism including:

a drum shifter with at least a part thereof disposed in said shift drum center so as to be capable of turning about an axis coaxial with said shift drum center;

a pair of pawls symmetrically mounted to said drum shifter so as to be tilted up and down in radial directions of said drum shifter;

a pair of springs for respectively energizing said pawls in tilting-up directions;

a plurality of engaging recesses provided at regular intervals along the circumferential direction at an inner periphery of said shift drum center so that both said pawls can be engaged therewith; and a fixed guide plate for guiding from the radially outer side the tilted conditions of both said pawls according to the turning of said drum shifter, wherein said guide plate is provided with a large-diameter arcuate part larger in diameter than an outer periphery of the drum shifter and a small-diameter arcuate part smaller in diameter than the outer periphery of the drum shifter, and connecting parts connecting said large-diameter arcuate part and said small-diameter arcuate part to each other, and said connecting parts are so formed as to engage said pawls with said engaging recesses in the course of turning of said drum shifter by a turning amount necessary for changing over the establishment conditions of said plurality of change gear stages of gear trains.

8. The vehicle transmission as set forth in claim 7, wherein said connecting parts engage said pawls with said engaging recesses in the condition where said shifters are putting said plurality of change gear stages of gear trains in non-established conditions.

9. The vehicle transmission as set forth in claim 7, wherein when each of the pair of pawls is tilted up, tip parts thereof protrude from an outer periphery of the drum shifter, and when each of the pair of pawls is tilted down, the tip parts are located at the same position as the outer periphery of the drum shifter.

10. The vehicle transmission as set forth in claim 7, wherein the large-diameter arcuate part is with an axis of turning of the shift drum center as a center of the large-diameter arcuate part.

11. The vehicle transmission as set forth in claim 7, wherein the connecting parts are provided at intermediate portions thereof with stepped parts for ensuring that the pair of pawls in engagement with the plurality of engaging recesses are moved to the small-diameter arcuate part side according to the turning of the drum shifter.

12. The vehicle transmission as set forth in claim 7, further comprising a restricting projected part projected from a central portion of the large-diameter arcuate part, said restricting projected part being formed to restrict the turning of the drum shifter by abutting against a tip part of one of the pair of pawls.

13. A vehicle transmission comprising:
first and second main shafts disposed coaxially so that power from an engine can be transmitted thereto;
a counter shaft connected to drive wheels;
a plurality of change gear stages of gear trains provided between said first and second main shafts and said counter shaft so as to be capable of selective establishment;

a shifter relatively non-rotatably and slidably disposed on said counter shaft so as to change over the establishment conditions of a pair of said plurality of change gear stages of gear trains that are provided between said second main shaft and said counter shaft;

a shift drum provided at an outer periphery thereof with a lead groove for engagement with a shift fork for rotatably holding said shifter;

a shift drum center turned together with said shift drum; and an intermittent feed mechanism for intermittently turningly driving said shift drum center, wherein the transmission of power from said engine to said second main shaft is interrupted when power from said engine is transmitted to said first main shaft when said shifter is slid so as to change over the establishment conditions of said pair of said plurality of change gear stages of gear trains between said second main shaft and said counter shaft, said intermittent feed mechanism including:

a drum shifter with at least a part thereof disposed in said shift drum center so as to be capable of turning about an axis coaxial with said shift drum center;

a pair of pawls symmetrically mounted to said drum shifter so as to be tilted up and down in radial directions of said drum shifter;

a pair of springs for respectively energizing said pawls in tilting-up directions;

a plurality of engaging recesses provided at regular intervals along the circumferential direction at an inner periphery of said shift drum center so that both said pawls can be engaged therewith; and a fixed guide plate for guiding from the radially outer side the tilted conditions of both said pawls according to the turning of said drum shifter, wherein said guide plate is provided with a large-diameter arcuate part larger in diameter than an outer periphery of the drum shifter and a small-diameter arcuate part smaller in diameter than the outer periphery of the drum shifter, and connecting parts connecting said large-diameter arcuate part and said small-diameter arcuate part to each other; and said connecting parts are so formed as to engage said pawls with said engaging recesses in the course of turning of said drum shifter by a turning amount necessary for changing over the establishment conditions of said plurality of change gear stages of gear trains.

14. The vehicle transmission as set forth in claim 13, wherein said connecting parts engage said pawls with said engaging recesses in the condition where said shifters are putting said plurality of change gear stages of gear trains in non-established conditions.

15. The vehicle transmission as set forth in claim 13, wherein when each of the pair of pawls is tilted up, tip parts thereof protrude from an outer periphery of the drum shifter, and when each of the pair of pawls is tilted down, the tip parts are located at the same position as the outer periphery of the drum shifter.

16. The vehicle transmission as set forth in claim 13, wherein the large-diameter arcuate part is with an axis of turning of the shift drum center as a center of the large-diameter arcuate part.

17. The vehicle transmission as set forth in claim 13, wherein the connecting parts are provided at intermediate portions thereof with stepped parts for ensuring that the pair of pawls in engagement with the plurality of engaging recesses are moved to the small-diameter arcuate part side according to the turning of the drum shifter.

18. The vehicle transmission as set forth in claim 13, further comprising a restricting projected part projected from a central portion of the large-diameter arcuate part, said restricting projected part being formed to restrict the turning of the drum shifter by abutting against a tip part of one of the pair of pawls.

* * * * *